(12) United States Patent
Kaneko et al.

(10) Patent No.: US 6,799,845 B2
(45) Date of Patent: Oct. 5, 2004

(54) RECORDING LIQUID, RECORDING CARTRIDGE, RECORDING METHOD, RECORDING APPARATUS AND RECORDING MEDIUM

(75) Inventors: Tetsuya Kaneko, Yokohama-si (JP); Masayuki Koyano, Zama-si (JP); Nobutaka Osada, Misima-si (JP); Hitoshi Arita, Yokohama-si (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/005,606

(22) Filed: Dec. 7, 2001

(65) Prior Publication Data

US 2003/0079647 A1 May 1, 2003

(30) Foreign Application Priority Data

Dec. 7, 2000 (JP) .................................... P2000-373275

(51) Int. Cl.[7] .................................................. B41J 2/01
(52) U.S. Cl. ..................... 347/100; 347/96; 106/31.13; 523/160
(58) Field of Search ........................... 347/100, 96, 101, 347/95; 106/31.6, 31.13, 31.27; 523/160

(56) References Cited

U.S. PATENT DOCUMENTS

| | | | | |
|---|---|---|---|---|
| 5,141,556 A | * | 8/1992 | Matrick | 347/100 |
| 5,356,464 A | * | 10/1994 | Hickman et al. | 347/100 |
| 5,514,208 A | | 5/1996 | Nagai et al. | |
| 5,622,550 A | | 4/1997 | Konishi et al. | |
| 5,810,915 A | | 9/1998 | Nagai et al. | |

(List continued on next page.)

FOREIGN PATENT DOCUMENTS

| | | | | |
|---|---|---|---|---|
| EP | 0812888 A2 | * | 6/1997 | C09D/11/00 |
| EP | 0924272 A1 | * | 11/1998 | C09D/11/00 |
| EP | 0922737 A1 | * | 12/1998 | C09D/11/00 |
| EP | 0924272 A1 | * | 6/1999 | C09D/11/00 |
| GB | 2330587 A | * | 9/1998 | C09D/11/02 |
| JP | 06-157959 | * | 6/1994 | B41J/2/01 |
| JP | 2000-290576 | * | 10/2000 | C09D/11/10 |

OTHER PUBLICATIONS

Industrial Solvents Handbook, 5th Edition, by Ernest W. Flick (1998).*

Primary Examiner—Stephen D. Meier
Assistant Examiner—Manish Shah
(74) Attorney, Agent, or Firm—Oblon, Spivak, McClelland, Maier & Neustadt, P.C.

(57) ABSTRACT

A recording liquid comprising a coloring agent and water, wherein the recording liquid containing a polyol (A) having a solubility in water at 20° C. of 0.2 wt. % or more and not more than 4.5 wt. %, and at least one compound (B) selected from a group consisting of compound represented by formula (1) $R_1, R_2, R_3.N \rightarrow O$ (where $R_1$ and $R_2$ are an alkyl group or a hydroxyalkyl group having 1 to 3 carbon atoms, and $R_3$ is an alkyl group or an alkenyl group having 10 to 20 carbon atoms), and of compound represented by formula (2) represented by $R_4, R_5, R_6.N$—$CH_2$—$CO$—$O^-$ (where $R_4$ and $R_5$ are an alkyl group or hydroxyalkyl group having 1 to 3 carbon atoms, and $R_6$ is an alkyl group or alkyl group derived from cocoanut oil having 10 to 16 carbon atoms that may contain an amide group). The recording liquid shows synergistic effect including a high permeability with modified penetrating property capable of eliminating an increasing in optical density at backside-surface of printing medium, anti-color bleeding property, and an effect on reduction of blurring of colors, by combination use of the polyol (A) and compound (B). The polyol (A) has a small molecular weight so that the adsorbing speed onto the surface to be printed is very high, and has a property to render the nitrogen moiety of the compound (B) into positive charge. The compound (B) effectuates on compound (A) to make it to be insoluble.

22 Claims, 2 Drawing Sheets

U.S. PATENT DOCUMENTS

| | | |
|---|---|---|
| 5,879,439 A | 3/1999 | Nagai et al. |
| 5,882,390 A | 3/1999 | Nagai et al. |
| 5,972,082 A | 10/1999 | Koyano et al. |
| 5,993,524 A | 11/1999 | Nagai et al. |
| 6,120,589 A | 9/2000 | Bannai et al. |
| 6,231,652 B1 | 5/2001 | Koyano et al. |
| 6,261,349 B1 | 7/2001 | Nagai et al. |
| 6,361,852 B1 * | 3/2002 | Gu et al. .................... 428/195 |
| 6,471,757 B1 * | 10/2002 | Koitabashi et al. ...... 106/31.28 |

* cited by examiner

RECORDING LIQUID, RECORDING CARTRIDGE, RECORDING METHOD, RECORDING APPARATUS AND RECORDING MEDIUM

BACKGROUND OF THE INVENTION

1. Field of the Invention

The present invention relates to a recording liquid, a recording liquid cartridge, a recording method, a recording apparatus and a recording medium. More specifically, the present invention relates to a recording liquid suitable for inkjet recording by an on-demand method with a piezoelectric system or a thermal system and the like, or by a continuous inkjet method with a charge-control system and the like, particularly, to a recording liquid featuring excellent characteristics associated with use of plain paper. Furthermore, the present invention relates to a recording liquid used also for aqueous writing instruments, to recording instruments, and for pen plotters, also relates to a recording cartridge containing this recording liquid, either to a recording method and to a recording apparatus using this recording liquid, and, to a recording medium preferably used for recording with these liquid, method and apparatus.

2. Description of the Related Art

The inkjet recording system has in recent years, been rapidly prevailing because of its compact body, low price, low running cost, and low noise.

Also, inkjet printers capable of printing on various types of non-coated plain paper for electro-photography, printing, typewriters, wire dot printers, word processors, writing letters, and writing reports are now commercially available.

For the inkjet printers, various types of ink having improved drying properties for images with high resolution have been proposed.

However, it is very difficult to satisfy all the aspects such as color reproducibility of images, waterproofing, light resistibility, drying properties of images, suppressing of image-blurring, reliability of ink ejection or other aspects.

In particular, in the case of color printers, images are likely to be degraded in a portion where two colors of red, green and blue are superimposed, although there is no degradation of images in a monochrome printed portion of yellow, magenta and cyan.

Especially in the case where images are dried without use of a fixing apparatus, while one might take in mind means to impose the drying property for enhancing permeability of ink printed, the same as or close to that disclosed in Japanese Unexamined Patent publication (Tokkai) No.55-29546, however such means cause the problem of significant bleeding on the paper in almost all cases.

Japanese Examined Patent Publication (Tokko) No. 60-23793 describes that dialkyl sulfosuccinate as a surfactant improves the drying properties, and there is little image degradation. However, the diameter of a pixel is significantly varied depending on the types of paper being used the image density is likely to degrade significantly.

Japanese Patent No. 1175616 discloses quick drying ink with use a surfactant including an ethylene oxide-adduct having an acetylene bonding to improve the permeability.

However, problems are caused, depending on the coloring agent. For example, in the case of an ink containing a direct dye such as DBK 168, the drying speed is not improved because of a hydrophobic behavior of the dye contained. Ink containing a pigment such as carbon black, the pigment aggregates readily so that clogging of nozzles is likely to occur, or the direction of inkjet is likely to be curved.

Furthermore, also in order to improve the drying speed, Japanese Unexamined Patent Publication (Tokkai) No. 8-113739 has proposed ink containing a dye and water-soluble glycol ether, and Japanese Unexamined Patent Publication (Tokkai) No. 10-95941 has proposed an ink composition containing a pigment, glycol ethers such as diethylene glycol mono-n-butyl ether and water.

However, it is necessary to add a large amount of glycol esters in order to improve the drying speed, which is not preferable in terms of ink odor or safety.

Japanese Unexamined Patent Publication (Tokkai) No. 56-57862 discloses an ink containing strongly basic substance. However, although it is effective to rosin-sized acidic paper, there is no or the least effect in the case of papers produced by impregnating of alkyl ketene dimmer or alkenyl sulfosuccinate as sizing agent and there is no effect on color-superimposed portion even in the case of acidic-paper-are used.

Japanese Unexamined Patent Publication (Tokkai) No. 2-138374 proposes an aqueous recording ink containing a water-soluble dye, water and a benzyl ether having a specific structure.

This publication also proposes to add an oily material into ink, in order to further improve the permeability of the ink, and the oily material includes as for instances vegetable oil, unsaturated fatty acid, higher alcohol, fatty acid ester, and mineral oil; and 2-ethyl-1,6-hexanediol, diethylene glycol hexyl ether, ethylene oxide adducts of acetylenic glycol (an addition mole number of 5 or less), ethylene glycol benzyl ether or the like, as a water-hardly soluble or slightly soluble solvent having a hydroxyl group in its molecule.

However, these inks have problems in safety, and large problems in stability because the oily material, the water-hardly soluble and slightly soluble solvent, benzyl ether or the like are separated at some ambient temperatures.

Japanese Patent No. 2894568 proposes a composition containing a coloring material and a liquid medium, which is served as inkjet ink containing 60 wt. % or more of water and 0.2 to 30 wt. % of alkylene glycol having 7 to 10 carbon atoms in this liquid medium.

As preferable specific examples of alkylene glycol having 7 to 10 carbon atoms, 1,7-heptanediol, 2,6-heptanediol, 2,4-dimethyl-2,4-pentanediol, and 3-ethyl-1,3-pentanediol are listed as for instances.

It is also described that these compounds are added into the ink so that bleeding of the ink on plain paper, the drying properties and the permeability are improved, and therefore the ink is given balanced features in the bleeding property and the permeability, therefore high reliability in prevention of clogging can be provided.

However, the addition of the listed compounds provides only insufficient improvements in the permeability of ink, actually, so that the drying properties are low and bleeding is still likely to occur depending on the type of papers. Thus, no solutions for conventional problems are provided.

Japanese Patent No. 2714482 proposes an inkjet ink containing aliphatic diol compounds of a specific structure having al least 6 carbon atoms and having a solubility of at least 4.5 parts by weight in 100 parts by weight of water at 25° C.

As examples of the diol compounds, 2-ethyl-2-methyl-1, 3-propanediol, 3,3-dimethyl-1,2-butanediol, 2,2-diethyl-1, 3-propanediol, 2-methyl-2-propyl-1,3-propanediol, 2,4- dimethyl-2,4-pentanediol, 2,5-dimethyl-2,5-hexanediol, 5-hexene-1,2-diol and the like are listed. Ink containing any one of the above has insufficient permeability. Color bleeding or feathering occurs.

As a method for reducing color bleeding in inkjet printing, Japanese Unexamined Patent Publication (Tokkai) No. 5-132643 proposes an ink for thermal inkjet printing having a composition containing a vehicle, a water-soluble dye, with at least one selected from ampholytic surfactant and nonionic surfactant in an amount at least equal to the critical concentration to hold micelle, an organic solvent for supporting the formation of micelle and water.

However, the above-described surfactant cannot provide sufficient permeability to the ink, so that the effect on prevention of bleeding is still insufficient.

Japanese Unexamined Patent Publication (Tokkai) No. 11-71543 proposes a composition containing a microemulsion including a dye, a water-insoluble organic compound, second organic compound compatible to the water-insoluble organic compound and water, an amphipathic substance and water, wherein the amphipathic substance-is present in an amount sufficient to dissolve the water-insoluble organic compound in the microemulsion. This publication also describes that this composition can reduce the drying time and can bring printings with eliminated bleeding.

However, in order to substantially improve the drying properties, it is necessary to add water-insoluble organic compound and an amphipathic substance in large amounts exceeding 30 wt. %, as shown in the examples described in its specification. Therefore, the ink viscosity becomes high, so that there are problems such as requiring heating to give high ability of ejecting ink and this results expensive ink.

Japanese Unexamined Patent Publication (Tokkai) No. 9-3371 proposes an ink composition for inkjet printing containing a liquid vehicle, a coloring agent, 10 to 20 wt. % of a betaine ampholytic base and 2 to 5 wt. % of a quasi-surfactant.

It is also described that although betaine itself has no surfactant characteristics, the quick drying properties can be improved by mixing it with a quasi-surfactant.

The quasi-surfactant refers to 1,2-hexanediol, 1,2-octanediol, diethylene glycol butyl ether, 2-methyl-2-propyl-1,3-propanediol and the like. Even if these are mixed with betaine, the quick drying properties are only slightly improved, and large amounts of betaine and quasi-surfactant are required to be added, which uselessly increases the ink viscosity, and thus this ink composition has problems similar to those of Japanese Unexamined Patent Publication (Tokkai) No. 11-71543.

The inventors of the present invention have proposed an aqueous ink containing 2-ethyl-1,3-hexanediol for the purpose of enhancing the permeability and a recording method using the same (Japanese Unexamined Patent Publication (Tokkai) No. 6-157959).

2-ethyl-1,3-hexanediol used in this invention is not contained in the listed compounds of Japanese Patent No. 2894568 described above, but was found among various compounds as a result of many times of trial-and-error by the inventors of the present invention.

Thus, an aqueous ink composition mentioned above have satisfied various characteristics as inkjet ink, and exhibited excellent permeability and drying properties, and improved image degradation was provided successfully, and a recording method for forming good image with this ink composition was provided successfully. Thus, a recording method using ink containing a small amount of that diol was provided, in which, this ink was able to be ejected by a stable high frequency driving, in a mode of safe and successful.

However, with remarkable technological advancement in recent years, the output speed of inkjet printers has been significantly increased, and it will be inevitable to be realized higher speed printing in the future.

Under these circumstances, in even higher speed printing, inks are required to be dried immediately without color bleeding, so as not to dirt, for example fingers, when rubbing images printed after output.

In general, ink having the drying properties improves its permeability on paper, however, it has adversative disadvantage that the coloring agent contained therein penetrates into the paper being used in recording, in the thickness direction, so that image density on the paper decreases, with increasing the optical density on backside surface of the paper due to the penetrating of ink to the back-surface.

In particular, in terms of the development of inkjet printers and paper consumption as an environmental problem, it is evident that printing on both faces is essential, and therefore an aqueous ink that hardly penetrates up to the back so as to allow printing on both faces is being required, thereby high drying properties being required.

Thus, at present time as well, inkjet inks satisfying various characteristics demanded for inkjet ink printing and having excellent permeability, and having drying properties regardless of the type of coloring agents or the type of paper, and showing improved image quality and controlled penetration property to the backward are now more required.

Furthermore, in recent years, in the field of printing of bar codes, postal-marks or codes for mailing or the like, a system provided with means that can read invisible information recorded by ink reactive to infrared rays or ultraviolet rays has been put in practice.

In view of preventing environmental pollution, as a recording liquid used for these applications, aqueous recording liquids are under research, and recording liquid to meet this requirement should be of not only aqueous but also of highly permeable and of responsible to high speed recording.

SUMMARY OF THE INVENTION

In view of the current situations as described above, it is an object of the present invention to provide a recording liquid (which may be referred to as an ink in some cases in the present invention) having high permeability and excellent ejecting or jetting stability and storage stability that can solve the problems suspended in conventional arts, and to provide a recording liquid cartridge containing this recording liquid, and to provide a recording method and a recording apparatus that can form images having high image density, with high-speed properties, and excellent image quality, with so low penetrating-property that doesn't make to it pass through until backside the recording material to bear images therein, In order to solve the above problems, with focussing on components to be contained in the recording liquid, in-depth research have been conducted, and as a result it is found out that a recording liquid having high permeability and excellent ejecting or jetting stability and storage stability can be provided by realizing the recording liquid containing a specific polyol and a specific compound, and a recording method and a recording apparatus that can form images having high image density, high-speed properties, and excellent image quality with hardly penetrating to the backside of recording medium, and high safety can be provided by using this recording liquid. And based on this finding, the present invention has been attained.

More specifically, according to the present invention, at first, the present invention provides (1) a recording liquid comprising a coloring agent and water, wherein the recording liquid contains a polyol (A) having a solubility in water ranging from 0.2 wt. % or more to less than 4.5 wt. %, at 20° C. and at least one compound (B) selected from a group consisting of compounds

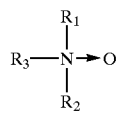

(1)

represented by formulae (1) and (2).

Where $R_1$ and $R_2$ are an alkyl group or a hydroxyalkyl group having 1 to 3 carbon atoms, and $R_3$ is an alkyl group or an alkenyl group having 10 to 20

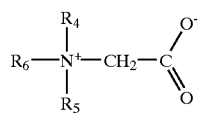

(2)

carbon atoms.
where $R_4$ and $R_5$ are an alkyl group or hydroxyalkyl group having 1 to 3 carbon atoms, and $R_6$ is an alkyl group or alkyl group derived from cocoanut oil having 10 to 16 carbon atoms that may contain an amide group.

At the second, the present invention provides (2) a recording liquid cartridge comprising a recording liquid reservoir containing a recording liquid, wherein the first recording liquid described in above paragraph (1) is used as the recording liquid, and a recording liquid cartridge comprising a recording liquid reservoir containing a recording liquid and a head portion for ejecting recording liquid droplets, wherein the first recording liquid described in above paragraph (1) is used as the recording liquid. Thirdly, the present invention provides (3) a recording method for forming images on a recording medium comprising ejecting to fry a recording liquid in form of droplets from small ink outlets, wherein the first recording liquid described in above paragraph (1) is used as the recording liquid. Fourthly, the present invention provides (4) an inkjet recording apparatus comprising a recording liquid cartridge having a recording liquid reservoir containing a recording liquid, or a recording head for ejecting recording liquid droplets, or an ink jet recording apparatus comprising: a recording liquid cartridge including: a recording liquid reservoir containing a recording liquid and a recording head for ejecting recording liquid droplets, wherein the second recording liquid cartridge described in above paragraph (2) is used as the recording liquid cartridge.

Fifthly, the present invention provides (5) a recording medium on which images are recorded with the first recording liquid described in above paragraph (1), wherein the recording medium containing pulp fibers as a main component, and has a sizing degree of 10 S or more and an air permeability of 5 to 50 S.

As for the polyol (A) having a solubility in water at ranging from 0.2 wt. % to less than 4.5 wt. % at 20° C., 1,3-diol represented by formula (3) below can be used preferably.

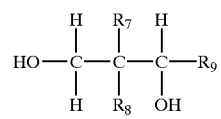

(3)

When this kind of 1,3-diol is used, the permeability can be improved more effectively, so that adding in only a small amount is sufficient. Therefore, this is used as a preferable polyol in terms of safety and odor.

The reason for this is still not clear, but it seems that 1,3-diol is asymmetric in its molecular structure and has a branched structure, so that it can modify the efficiency and speed in absorbing to the surface and thus can improve the permeability efficiently.

Specific examples of preferable polyol (A) include 2-ethyl-1,3-hexanediol (solubility in water at 20° C. of 4.2%), and 2,2,4-trimethyl-1,3-pentanediol (solubility in water at 20° C. of 3.0%).

These diols are preferable in term of the safety and the storage stability of the obtained recording liquid, and have another advantage that they are all industrially useful and available in a large amount so that a recording liquid can be produced at a relatively low cost.

As for the compound represented by general formula (1), compounds represented by formulae (1)-1 to (1)-7 can be used, but the present invention is

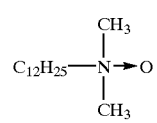

(1)-1 not limited thereto.

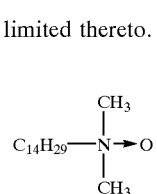

(1)-2

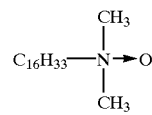

(1)-3

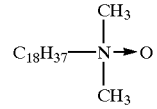

(1)-4

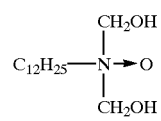

(1)-5

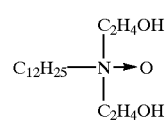

(1)-6

-continued

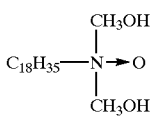
(1)-7

These compounds can be used alone or in combination of a plurality of them.

Examples of commercially available surfactants containing these compounds as the main component include the Unisafe series available from NOF CORPORATION, the AROMOX series available from LION Corporation, and AMPHITOL 20N available from Kao Corporation.

As the compound represented by general formula (2), compounds represented by formulae (2)-1 to (2)-5 can be used, but the present invention is

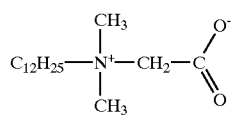
(2)-1 not limited thereto.

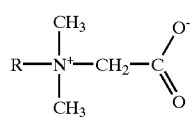
(2)-2

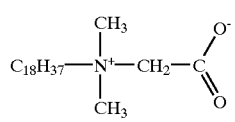
(2)-3

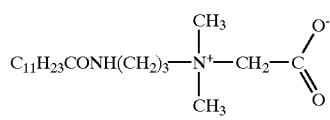
(2)-4

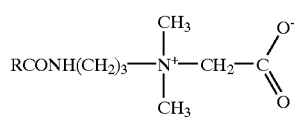
(2)-5

R in formula (2)-2 is a coconut oil residue, and R in formula (2)-5 is a coconut oil fatty acid residue.

These compounds can be used alone or in combination with a plurality of them.

Examples of commercially available surfactants containing these compounds as the main component include the AMPHITOL series available from Kao Corporation, the NISSAN ANON series available from NOF CORPORATION, the LEBON series available from Sanyo Chemical Industries, Ltd., the LIPOMIN series available from LION Corporation, the SWANOL SM series and the MIRATAINE series available from Nikko Chemicals Co., Ltd, the AMOGEN series available from Dai-ichi Kogyo Seiyaku Co., Ltd., and the OVASOLINE series available from Toho Chemical Industry Co., Ltd.

In this case, when ejecting the recording liquid with micro nozzles such as inkjet for use, it is preferable to remove an inorganic salt for use in order to reduce the possibility of occurrence of nozzle clogging or the like.

As the compound (B), the compounds represented by general formula (1) and (2) can be used alone or in combination.

The recording liquid of the present invention contains the compound (B) as above and polyol having a solubility of 0.2 wt. % or more and not more than 4.5 wt. % with respect to water at 20° C. as the polyol (A), so that the recording liquid can be provided with very high permeability, and can be stable without separating in the liquid and highly safe.

The function thereof is not clear at the present, but it is speculated as follows: Polyol having a solubility of 0.2 wt. % or more and not more than 4.5 wt. % enables the water-based recording liquid containing thereof, to have an ability to be absorbed immediately into recording medium, and has a comparatively smaller molecular weight than that of so-called surfactants, so that the adsorbing speed onto the surface is very high.

In other words, when the recording liquid containing containing the polyol is adsorbed to the surface to be printed, the surface tension of the liquid can be promptly reduced in the same manner as a surfactant.

However, the polyol, as a rule, has a smaller difference between the hydrophilic moiety and the hydrophobic moiety than that of the surfactants, thereby conventional liquids have been required to add a large amount in the case of the use only polyol, in order to obtain high permeability.

In those conventional cases, the recording liquid containing a large amount of polyol being added is not preferable because of problems such as poor safety, phase separation, adsorption to a coloring agent and aggregation, and odor in some cases.

On the other hand, although it has been known that the surfactant of the compound (B) reduces the surface tension and improves the permeability, but the adsorption speed onto the surface to be applied has not necessarily been high because of the size of the molecules or the shape thereof, so that sufficient permeability has not be able to been obtained.

When the polyol (A) and the compound (B) are used in the combination, use of a very small amount is now can provide a very high permeability because of the synergistic effect. With such a high permeability, the nitrogen moiety of the compound (B) is easily charged in positive, by the influence of carbon dioxide in the air or the like, thereby coloring gradient changes the anion component to be impossible to dissolve, so that the use of the polyol (A) and the compound (B) in combination is effective on reduction of blurring of colors or color bleeding. Those effects are now found and we reached to the present invention.

It is preferable that the content of the polyol (A) is 0.1 to 8 wt. % with respect to the recording liquid.

When it is less than 0.1 wt. %, the permeability is not sufficiently improved. When it is more than 8 wt. %, the polyol (A) is not dissolved in the recording liquid stably, so that problems in the storage stability of the recording liquid or the jet stability in inkjet may be caused.

More preferably, it is 0.5 to 5 wt. %.

It is preferable that the content of the compound (B) is 0.01 to 4 wt. %.

When it is less than 0.01 wt. %, the permeability is not sufficiently improved. When it is more than 4 wt. %, the compound (B) is not dissolved in the recording liquid stably, or even if it is dissolved, the viscosity is high, so that problems in the storage stability of the recording liquid or the jet stability in inkjet may be caused.

More preferably, it is 0.05 to 2 wt. %.

When the polyol (A) has a low solubility in water and is added to the recording liquid separately, it can be readily separated under some environmental conditions, but the compound (B) makes the polyol (A) compatible so that a stable recording liquid can be obtained.

Not only the stability of the recording liquid, but also higher permeability can be obtained by addition of a smaller amount of the mixture of the polyol (A) and the compound (B) than when they are added separately, because of the synergistic effect.

In other words, compared to the conventional recording liquid obtained by adding a large amount of esters of polyhydric alcohol to improve the permeability, the recording liquid of the present invention has the advantages of high safety with less odor of the solvent or the like, because the effects can be obtained with the addition of a smaller amount to the recording liquid.

Furthermore, Japanese Patent 2894568 proposes a composition containing a coloring material and a liquid medium, which is inkjet ink containing 60 wt. % or more of water and 2 to 30 wt. % of alkylene glycol having 7 to 10 carbon atoms in this liquid medium. However, it is becomes to be undoubted that even if alkylene glycol compounds have 7 to 10 carbon atoms, the bonding position of the hydroxyl group or the number of carbons therein makes them different significantly in the affinity of the compound with respect to water or the permeability of the ink containing them.

The polyol (A) of the present invention is not contained in the list of the compounds of Japanese Patent No. 2894568, but is found among various compounds as a result of trial and error by the inventors of the present invention.

The present invention using a combination of the polyol (A) and the compound (B) has a distinct effect on the permeability of the ink- or image-blurring compared to those disclosed in Japanese Patent No. 2894568, which only reaveals a fact that any alkylene glycol having 7 to 10 carbon atoms is effective.

Furthermore, in conventional recording method with a bubbling system or thermal system where thermal energy was applied to ink so that ejecting ink in form of droplets from micro pores, 2-propanol has been added to obtain ejecting stability. In the present invention, the polyol (A) is added instead of 2-propanol, so that the wettability to thermal elements is improved, the ejecting stability and the frequency stability can be obtained with addition of a small amount of the polyol (A), and the safety problem cursed by the use of 2-propanol can be improved.

Furthermore, in the present invention, it is found that addition of 2-pyrolidone gives an excellent effect of preventing penetration to the backside of printing medium as well as improvement in the image density.

This is believed to result from the following. When 2-pyrolidone is contained, the recording liquid is spread easily on the surface of a sheet so that the permeation in the thickness direction of the sheet is relatively suppressed, and therefore the coloring agent can stay near by the surface of the sheet.

The amount of 2-pyrolidone to be added is preferably 0.05 to 8 wt. % with respect to the recording liquid, and more preferably 0.5 to 4 wt. %.

It is also found that in the recording liquid of the present invention, for the purpose of preventing clogging caused by drying of the recording liquid and improving the dissolution stability of the recording liquid, a humectant is contained in an amount of 5 to 50 wt. % in the recording liquid, so that even if the water content in the recording liquid has evaporated, clogging hardly occurs and normal printing can be achieved. Even if clogging would occur, normal printing can be restored by a simple cleaning operation.

For this humectant, a low volatile water-soluble organic solvent is preferable.

The low volatile water-soluble organic solvent can act as a dissolution auxiliary for the polyol (A) and the compound (B), and contributes to even higher storage stability and jet stability of the recording liquid.

Examples of low volatile water-soluble organic solvents include polyhydric alcohols such as ethylene glycol, diethylene glycol, triethylene glycol, tetraethylene glycol, propylene glycol, dipropylene glycol, tripropylene glycol, polyethylene glycol, polypropylene glycol, 1,3-butanediol, 2,3-butanediol, 1,4-butanediol, 1,5-pentanediol, 2-methyl-2,4-pentanediol, 1,6-hexanediol, glycerin, 1,2,6-hexanetriol, 1,2,4-butanetriol, 1,2,3-butanetriol and petriol, polyhydric alcohol alkylethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether, polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, $\epsilon$-caprolactam and $\gamma$-butyrolactone; amides such as formamide, N-methylformamide and N,N-dimethylformamide; amines such as monoethanolamine, diethanolamine, triethanolamine, monoethylamine, diethylamine and triethylamine, sulfur-containing compounds such as dimethylsulfoxide, sulfolane, thiodiethanol and thiodiglycol, propylene carbonate, and ethylene carbonate. These solvents can be used alone or in combination with a plurality of them together with water.

The amount of the low volatile water-soluble organic solvent to be added is preferably 5 to 50%, as described above, more preferably 8 to 30%.

When it is less than 5%, the effect of suppressing evaporation of the water content in the recording liquid is insufficient, and the effect as the dissolution auxiliary is insufficient, depending on the contents the polyol (A) and the compound (B), so that problems such as impairing the storage stability and jet stability of the recording liquid may be caused.

An amount exceeding 50% is not preferable because problems such as poor jet stability in inkjet due to an increase in the viscosity, and deterioration in cockling of the image portion after printing may be caused.

It is preferable that the recording liquid of the present invention contains the water-soluble organic solvent, particularly, in view of the compatibility with the polyol (A) and the compound (B).

Examples of the water-soluble organic solvent include glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, N-hydroxyethyl-2-pyrrolidone, and 1,3-dimethyl-2-imidazolidinone.

Among these water-soluble organic solvents, it is particularly preferable to use glycerin, diethylene glycol alone or in combination with other solvents in view of the safety and the cost.

The amount of the water-soluble organic solvent to be added is preferably 20% or less, more preferably 5 to 15%.

In the inkjet recording method, it is important to adjust the wettability of the recording liquid with respect to the components constituting the inkjet head for high quality images.

For adjustment of the wettability, a surfactant can be further added to the recording liquid.

Examples of the surfactants include anionic surfactants such as ammonium salt of polyoxyethylene alkyl ether sulfate, cationic surfactants such as quaternary ammonium salt, ampholytic surfactants such as imidazoline derivatives, nonionic surfactants such as polyoxyethylene alkyl phenyl ether, polyoxyethylene alkyl ester, polyoxyethylene alkylamine, polyoxyethylene alkylamide, sorbitan fatty acid ester, polyoxyethylene sorbitan fatty acid ester, acetylene alcohol added with ethylene oxide, and fluorochemical surfactants.

For these surfactants, the type and the amount can be determined as appropriate so as to provide the recording liquid with the desired properties.

The coloring agent used for the recording liquid of the present invention, a dye and/or a pigment is used.

As the water-soluble dye used as the coloring agent, dyes classified into acid dyes, direct dyes, basic dyes, reactive dyes, and food dyes in the Color Index can be used. These dyes can be used in combination, or used in combination with other coloring materials such as a pigment, if necessary.

Examples of acid dyes and food dyes include C. I. Acid Yellow 17, 23, 42, 44, 79 and 142, C. I. Acid Red 1, 8, 13, 14, 18, 26, 27, 35, 37, 42, 52, 82, 87, 89, 92, 97, 106, 111, 114, 115, 134, 186, 249, 254 and 289, C. I. Acid Blue 9, 29, 45, 92 and 249, C. I. Acid Black 1, 2, 7, 24, 26 and 94, C. I. Food Yellow 2, 3 and 4, C. I. Food Red 7, 9 and 14, and C. I. Food Black 1 and 2.

Examples of direct dyes include C. I. Direct Yellow 12, 24, 26, 33, 44, 50, 120, 132, 142, 144 and 86, C. I. Direct Red 1, 4, 9, 13, 17, 20, 28, 31, 39, 80, 81, 83, 89, 225 and 227, C. I. Direct Orange 26, 29, 62 and 102, C. I. Direct Blue 1, 2, 6, 15, 22, 25, 71, 76, 79, 86, 87, 90, 98, 163, 165, 199 and 202 and C. I. Direct Black 19, 22, 32, 38, 51, 56, 71, 74, 75, 77, 154, 168 and 171.

Examples of basic dyes include C. I. Basic Yellow 1, 2, 11, 13, 14, 15, 19, 21, 23, 24, 25, 28, 29, 32, 36, 40, 41, 45, 49, 51, 53, 63, 465, 67, 70, 73, 77, 87 and 91, C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112, C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155 and C. I. Basic Black 2 and 8.

Examples of reactive dyes include C. I. Reactive Black 3, 4, 7, 11, 12 and 17, C. I. Reactive Yellow 1, 5, 11, 13, 14, 20, 21, 22, 25, 40, 47, 51, 55, 65 and 67, C. I. Reactive Red 1, 14, 17, 25, 26, 32, 37, 44, 46, 55, 60, 66, 74, 79, 96 and 97 and C. I. Reactive Blue 1, 2, 7, 14, 15, 23, 32, 35, 38, 41, 63, 80 and 95.

As the dye, especially acid dyes and direct dyes can be preferably used, and an excellent effect on improvement of the dissolution stability of the recording liquid of the present invention, the tone, the waterproofing and the light resistibility can be obtained.

The amount of the dye as the coloring agent in the recording liquid composition is preferably 0.5 to 25%, more preferably 2 to 15%.

For the pigment to be used, there is no particular limitation regarding the type, and inorganic pigments or organic pigments can be used.

Compared to dyes, pigments are not dissolved in the recording liquid, and are dispersed in the form of particles, so that even if the recording liquid with the same characteristics is used, the recording liquid containing a pigment hardly permeates deep in the sheet, so that the image density is high and image quality with less penetration to the back can be obtained.

The polyol (A) and the compound (B) are used together in the present invention so that a recording liquid having both quick drying properties and high image density without compromising the dispersion stability in the recording liquid can obtained.

Examples of inorganic pigments include titanium dioxide, ferric and ferrous oxides, calcium carbonate, barium sulfate, aluminum hydroxide, barium yellow, cadmium red and chrome yellow. In addition to these, carbon black manufactured by a known method such as a contact method, a furnace method and a thermal method can be also used.

Examples of organic pigments include azo pigment (including azo lake, insoluble azo pigment, condensed azo pigment and chelate azo pigment), polycyclic pigment (e.g., phthalocyanine pigment, perylene pigment, perinone pigment, anthraquinone pigment, quinacridone pigment, dioxazine pigment, indigo pigment, thioindigo pigment, isoindolinone pigment and quinophthalon pigment), dye chelate (e.g., basic dye type chelate and acid dye type chelate), nitro pigment, nitroso pigment, and aniline black.

Among these pigments, pigments having high affinity with water can be used preferably.

The amount of the pigment in the recording liquid is preferably 0.5 wt. % to 25 wt. %, more preferably 2 to 15 wt. %.

Specific examples of pigments for black that are preferably used in the present invention include carbon blacks (C. I. Pigment Black 7) such as furnace black, lamp black, acetylene black and channel black; metals such as copper, iron (C. I. Pigment Black 11) and titanium dioxide; and organic pigments such as aniline black (C. I. Pigment Black 1).

Furthermore, examples of pigments for color include C. I. Pigment Yellow 1, 3, 12, 13, 14, 17, 24, 34, 35, 37, 42 (yellow iron oxide), 53, 55, 81, 83, 95, 97, 98, 100, 101, 104, 408, 109, 110, 117, 120, 138, 150, and 153, C. I. Pigment Orange 5, 13, 16, 17, 36, 43 and 51, C. I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209, and 219, C. I. Pigment Violet 1 (Rhodamine Lake), 3, 5:1, 16, 19, 23 and 38, C. I. Pigment Blue 1, 2, 15 (phthalocyanine blue), 15:1, 15:2, 15:3 (phthalocyanine blue), 16, 17:1, 56, 60, and 63 and C. I. Pigment Green 1, 4, 7, 8, 10, 17, 18 and 36.

As a pigment for black for use, carbon black is preferable.

This is because carbon black as a black recording liquid provides excellent tone, and excellent waterproofing, light resistibility and dispersion stability, and is inexpensive.

Graft pigments obtained by treating the surface of another pigment (e.g., carbon) with a resin or the like to make it dispersible in water, processed pigments obtained by adding a functional group such as a sulfone group and a carboxyl group to the surface of a pigment (e.g., carbon) to make it dispersible in water or other pigments can be used.

Furthermore, a pigment can be encapsulated in a microcapsule to make the pigment dispersible in water.

For the pigments in the recording liquid, the average particle size is preferably 10 to 200 nm.

Herein, "average particle size" refers to the value at a volume cumulative percent of 50%.

For measurement of the values at a volume cumulative percent of 50%, for example, a method referred to as "dynamic light scattering" (Doppler scattering light analysis) can be used. In this method, particles in Brownian motion in the recording liquid are irradiated with laser light, and the particle size is obtained based on the change amount of the frequency of light (backscattering light) that has been returned from the particles.

When a pigment is used as a coloring agent, the waterproofing and the light resistant are satisfactory, and penetration of the recording liquid up to the back face, which is a phenomenon where the recording liquid penetrates the layer of the recording medium and oozes out from the back (hereinafter, which may be referred to simply as "penetration to the back") can be prevented.

Since the pigment is not dissolved but dispersed in the recording liquid, in inkjet printing, the pigment goes into the recording medium with more difficulty than liquid components of the recording liquid, and stays near the surface of the recording medium. Therefore, it dries fast and the penetration to the back can be prevented.

When the average particle size is less than 10 nm, the effect of preventing the penetration to the back is small. An average particle size exceeding 200 nm is not preferable, because the dispersion stability of the recording liquid may be deteriorated, and the particle size may be increased because of aggregation during storage or the like, so that the ejection stability may be deteriorated.

It is preferable to add the pigment to the recording liquid in the form of a pigment dispersing liquid obtained by dispersing the pigment in a water-soluble medium with a dispersant.

As the dispersant, known dispersants used for adjusting conventional known pigment dispersing liquids can be used, and for example, the following can be used as a high molecular weight dispersant:

Examples of hydrophilic polymer are as follows. Examples of natural polymer include vegetable polymers such as arabian gum, tragacanth gum, guar gum, karaya gum, locust bean gum, arabinogalactan, pectin and quince seed starch, seaweed polymers such as alginic acid, carrageenan and agar, animal polymers such as gelatin, casein, albumin and collagen, and microbial polymers such as xanthan gum and dextran. Examples of semisynthetic hydrophilic polymer include cellulose polymers such as methyl cellulose, ethyl cellulose, hydroxyethyl cellulose, hydroxypropyl cellulose and carboxymethyl cellulose, starch polymers such as sodium carboxymethyl starch and starch sodium phosphate ester and seaweed polymers such as sodium alginate and propylene glycol ester alginate. Examples of pure synthetic hydrophilic polymer include polyacrylic acid, polymethacrylic acid, acrylic acid-acrylonitrile copolymer, vinyl acetate-acrylic acid ester copolymer, acrylic acid-acrylic acid alkyl ester copolymer, styrene-acrylic acid copolymer, styrene-methacrylic acid copolymer, styrene-acrylic acid-acrylic acid alkyl ester copolymer, styrene-methacrylic acid-acrylic acid alkyl ester copolymer, styrene-$\alpha$-methylstyrene-acrylic acid copolymer, styrene-$\alpha$-methylstyrene-acrylic acid copolymer-acrylic acid alkyl ester copolymer, styrene-maleic acid copolymer, vinyl naphthalene-maleic acid copolymer, vinyl acetate-ethylene copolymer, vinyl acetate-fatty acid vinyl ethylene copolymer, vinyl acetate-maleate copolymer, vinyl acetate-crotonic acid copolymer and vinyl acetate-acrylic acid copolymer.

For the copolymer, the weight average molecular weight is preferably 3,000 to 50,000, more preferably 5,000 to 30,000, and even more preferably 7,000 to 15,000.

The amount of the high molecular weight dispersant to be added can be determined as appropriate so as to disperse the pigment stably in the range that does not inhibit other effects of the present invention.

The weight ratio of the pigment to the dispersant is preferably 1:0.06 to 1:3, and preferably 1:0.125 to 1:3.

It is also possible to use a water-soluble surfactant as the dispersant for pigment.

In this case, an increase in the ink viscosity with respect to the amount of a water-soluble surfactant used is smaller than when a high molecular weight dispersant is used, so that when it is used in a inkjet recording method, pigment ink having good ejection characteristics can be obtained more easily.

Specific examples of the water-soluble surfactant that is used as a dispersant for pigment are as follows. Examples of anionic surfactants include alkylallyl or alkylnaphthalene sulfonate, alkyl phosphate, alkyl sulfate, alkylsulfonate, alkyl ether sulfate, alkyl sulfosuccinate, alkyl ester sulfate, alkyl benzene sulfonate, alkyl diphenyl ether disulfonate, alkyl aryl ether phosphate, alkyl aryl ether sulfate, alkyl aryl ether ester sulfate, olefin sulfonate, alkane olefin sulfonate, polyoxyethylene alkyl ether phosphate, polyoxyethylene alkyl ether sulfate, ether carboxylate, sulfosuccinate, $\alpha$-sulfo fatty acid ester, fatty acid salt, condensation product of higher fatty acid and amino acid, and naphthenic acid salt.

Examples of cationic surfactants include alkylamine salt, dialkylamine salt, aliphatic amine salt, benzalkonium salt, quaternary ammonium salt, alkylpyridinium salt, imidazolinium salt, sulfonium salt and phosphonium salt.

Examples of nonionic surfactants include polyoxyethylene alkyl ether, polyoxyethylene alkyl allyl ether, polyoxyethylene alkyl phenyl ether, polyoxyethylene glycol ester, polyoxyethylene fatty acid amide, polyoxyethylene fatty acid ester, polyoxyethylene polyoxypropylene glycol, glycerin ester, sorbitan ester, sucrose ester, polyoxyethylene ether of glycerin ester, polyoxyethylene ether of sorbitan ester, polyoxyethylene ether of sorbitol ester, fatty acid alkanolamide, amine oxide, polyoxyethylene alkylamine, glycerin fatty acid ester, sorbitan fatty acid ester, polyoxyethylene sorbitan fatty acid ester, polyoxyethylene sorbitol fatty acid ester and alkyl (poly)glycoxyde.

Examples of ampholytic surfactants include imidazoline derivatives such as imidazolinium betaine; dimethylalkyl lauryl betaine, alkyl glycine and alkyl-di(aminoethyl) glycine.

The amount of the surfactant as the dispersant in the recording liquid can be determined as appropriate so as to disperse the pigment stably in the range that does not inhibit other effects of the present invention.

It is preferable that a carboxyl group is bonded to the dispersant in the recording liquid.

When a carboxyl group is bonded to the dispersant, not only is the dispersion stability improved, but also can high definition printing quality be obtained, and the waterproofing of the recording medium after printing can be obtained.

Furthermore, the effect of preventing the penetration to the back can be obtained.

In particular, when a pigment dispersed with a dispersant bonded to a carboxyl group, the polyol (A) and the compound (B) are used together, sufficient drying speed can be obtained, and the penetration to the back hardly occurs, even if images are printed on a recording medium having a comparatively high sizing degree such as plain paper.

A possible reason for this is as follows. Since the dissociation constant of the carboxyl group is smaller than that of other acid groups, after the pigment is attached to the recording medium, the solubility of the dispersant itself is reduced by a reduction in the pH of the recording liquid or an interaction of polyvalent metal ions such as calcium present near the surface of the recording medium, so that the dispersant itself or the pigment aggregates.

As another preferable form of the present invention, the surface of the pigment in the recording liquid is improved so that a carboxyl group is bonded directly to the pigment and dispersed in water.

In this case, since the surface of the pigment in the recording liquid is improved so as to be bonded to a carboxyl group, not only is the dispersion stability improved, but also high can definition printing quality be obtained, and the waterproofing of the recording medium after printing can be improved further.

Furthermore, the recording liquid in this form has excellent redispersibility after drying, so that even if printing is paused for a long time, and the water content of the recording liquid near the nozzles of the inkjet head has evaporated, a simple cleaning operation easily allows printing to be performed satisfactorily without clogging.

Moreover, the present invention can be applied to printing of bar codes, postmarks of mails or the like with an invisible recording liquid that has been rapidly spread in recent years.

In this case, an infrared ray absorbent or an ultraviolet ray absorbent having absorption peaks not in the visible region but in the infrared or ultraviolet ray region is added to the recording liquid, instead of regular dyes or pigment.

Other additives that are conventionally known can be added to the recording liquid of the present invention.

For example, a resin emulsion can be added.

A resin emulsion that can be used in the present invention refers to emulsion where the continuous phase is constituted by water and the dispersed phase is constituted by the following resin component.

Examples of the resin components in the dispersed phase include acrylic resins, vinyl acetate resins, styrene-butadiene resins, vinyl chloride resins, acrylic-styrene resins, butadiene resins, and styrene resins.

It is preferable that these resins are polymers having both a hydrophilic moiety and a hydrophobic moiety.

There is no limitation regarding the particle size of these resin components, but as long as it is sufficient to form an emulsion, but it is preferably about 150 nm or less, and more preferably about 5 to 100 nm.

These resin emulsions can be prepared by mixing resin particles in water, if necessary with a surfactant.

Examples of commercially available resin emulsions include MICROGEL E-1002 and E-5002 (styrene-acrylic resin emulsions manufactured by Nippon Paint Co., Ltd.), VONCOAT 4001 (acrylic resin emulsion manufactured by Dainippon Ink & Chemicals, Inc.), VONCOAT 5454 (styrene-acrylic resin emulsion manufactured by Dainippon Ink & Chemicals, Inc.), SAE-1014 (styrene-acrylic resin emulsion manufactured by Nippon Zeon Co., Ltd.) and SAIBINOL SK-200 (acrylic resin emulsion manufactured by Saiden Chemical Industry Co., Ltd.).

The recording liquid of the present invention contains the resin emulsion such that the resin component is preferably 0.1 to 40 wt. %, more preferably 1 to 25 wt. %.

The resin emulsion has the properties of thickening and aggregating, and has the effects of suppressing the permeation of the coloring component in the depth direction of the sheet and facilitating the fixation thereof on the recording material.

The resin emulsions of some types form a film on the recording material and thus have the effect of improving the rubbing resistance of printed matters.

Furthermore, saccharides can be contained for the purpose of suppressing evaporation of the water content in the recording liquid.

Examples of saccharide include monosaccharide, disaccharide, oligosaccharide (including trisaccharide and tetrasaccharide) and polysaccharide, and preferable examples thereof include glucose, mannose, fructose, ribose, xylose, arabinose, galactose, maltose, cellobiose, lactose, sucrose, trehalose and maltotriose.

Herein, the term "polysaccharides" refers to saccharides in a broad sense and includes substances present widely in the nature such as α-cyclodextrin and cellulose.

As derivatives of these saccharides, reducing sugars of the above-listed saccharides (e.g., sugar alcohol [general formula $HOCH_2(CHOH)nCH_2OH$, where n=an integer of 2 to 5], sugar oxide (e.g., aldonic acid, uronic acid or the like), amino acid, thio acid or the like can be used.

In particular, sugar alcohol is preferable, and specific examples thereof include maltitol and sorbitol.

The content of the saccharide is preferably 0.1 to 40 wt. %, more preferably 0.5 to 30 wt. %.

Other than that, sodium alginate can be contained.

Sodium alginate is a substance contained only in phaeophytes, and is a hydrophilic high molecular weight electrolyte that is present primarily as a cell membrane or an intercellular substance.

Chemically, it is a polymer of D-Mannuronic acid [M] with a β-1,4 bond and L-Guluronic acid [G] with an α-1,4 bond.

Sodium alginate has the effects of a thickening function, a stabilizing function, a dispersing function, a gel-forming function, a film-forming function and the like.

When it is added to an inkjet recording liquid, bleeding of a single color (feathering) or bleeding between different colors (color bleeding) can be improved by a change in the viscosity by pH, precipitation by salts, formation of a gel with polyvalent cations.

As an antiseptic or an antifungal agent, sodium dehydroacetate, sodium sorbate, 2-pyridinethiol-1-oxide sodium, sodium benzoate, pentachlorophenol sodium and the like can be added to the recording liquid of the present invention.

A pH adjusting agent also can be used, and any pH adjusting agent can be used as long as it can adjust the pH to a desired value without adversely affecting the prepared recording liquid.

Examples thereof include amines such as diethanolamine and triethanolamine, hydroxides of alkali metal elements such as lithium hydroxide, sodium hydroxide and potassium hydroxide, ammonium hydroxide, quaternary ammonium hydroxide, quaternary phosphonium hydroxide, carbonates of alkali metals such as lithium carbonate, sodium carbonate and potassium carbonate.

Moreover, chelating reagents such as sodium ethylenediamine tetraacetate, sodium nitrilotriacetate, sodium hydroxyethyl ethylenediaminetriacetate, sodium diethylenetriaminepentaacetate, sodium uramil diacetate and the like can be used.

Furthermore, rust-preventive agents such as acid sulfite, sodium thiosulfate, ammonium thiodiglycolate, diisopropyl ammonium nitrite, pentaerythritol tetranitrate, dicyclohexylammonium nitrite and the like can be also used.

Other than the above, water-soluble ultraviolet absorbent can be added, depending the applications.

The recording liquid of the present invention can be used particularly preferably in an inkjet recording method that ejects or jets the recording liquid in the form of droplets from small ink outlets to form color images in a recording medium. However, the present invention is also useful as the recording liquid for ordinary writing instruments such as aqueous pens, aqueous markers and aqueous ball-point pens, recording instruments and pen plotters.

The recording liquid of the present invention can be used in a wide range of applications, and is not limited to the above-described applications.

Secondly, the present invention provides a recording liquid cartridge provided with a recording liquid reservoir containing a recording liquid, wherein as the recording liquid, the first recording liquid is used.

This recording liquid cartridge can be a recording liquid cartridge provided with a recording liquid reservoir containing a recording liquid and a head portion for ejecting recording liquid droplets.

This recording liquid cartridge will be described in details later.

Thirdly, the present invention provides a recording method for forming images on a recording medium by ejecting or jetting a recording liquid in the form of droplets from small ink outlets, wherein as the recording liquid, the first recording liquid is used.

When the recording liquid is used in this inkjet recording method, it is necessary to adjust the viscosity of the recording liquid as desired.

Although it depends on the ejection ability of the head, in general, the viscosity of the recording liquid is preferably 10 mPa·s or less.

A viscosity of more than 10 mPa·s is not preferable, because sufficient ejection cannot be achieved so that poor images may be produced.

The recording method of the present invention is preferably a method for forming images on a recording medium by applying thermal energy corresponding to a recording signal to the recording liquid to generate droplets with the thermal energy.

It is preferable that the recording medium of the present invention contains pulp fiber as the main component, and has a sizing degree of 10 s or more and an air permeability of 5 to 50 s.

If images are printed on such a recording medium with the recording liquid of the present invention, even if images are printed on both faces of the recording medium by the inkjet recording method, the images are never prevented from being recognized by the images on the back.

Herein, the sizing degree refers to the value obtained based on the Stoeckigt sizing degree test method according to JIS P-8122 to 76, and the air permeability refers to the value obtained based on the air permeability test according to JIS P8117 to 80.

A sizing degree of less than 10 s is not preferable, because the recording liquid permeates in the sheet up to the back so that the penetration to the back may occur. Also, an air permeability of less than 5 s is not preferable, because the recording liquid permeates in the sheet up to the back so that the penetration to the back may occur.

When the air permeability exceeds 50 s, there is no problem in the printing quality or the drying properties, but it is not preferable, because a filler is added in an amount more than necessary, leading to a high cost.

When this recording medium is used in copiers or printers for electro-photography, the filler is transferred to a photoreceptor or a fixing roller, resulting in poor image quality or malfunction of the machines. Therefore, after all, this recording medium should be used exclusively for inkjet printing, and the consumers have to choose appropriate paper in every occasion, which gives a large burden on the consumers.

The recording medium as described above can be used as paper for electro-photography, printing, typing, wire dot printers, writing letters, and writing reports, and can be handled in the same manner as various other non-coated plain paper, and therefore it can save the user from having to separate it from other plain paper.

Furthermore, the recording medium of the present invention basically can be produced by a existing paper maker, so that facility investment can be minimized, and can be used also for other recording systems.

As pulp fiber materials, any suitable materials can be used, regardless of the type of pulp or the processing method, as long as it does not affect the inkjet process.

Furthermore, non-wood pulp (e.g., kenaf, flax, bamboo, seaweeds, etc.) or used paper pulp can be used, or those containing them as the main component can be used.

Chemical pulp typified by LBKP and NBKP is preferable.

These pulps can be produced in the regular method in the same manner as general plain paper, if necessary using a known sizing agent, a filler, other papermaking auxiliaries.

As the sizing agent, for example, rosin size, AKD, sodium chloride potassium chloride, styrene-meleic acid copolymer, quaternary ammonium salt, alkenyl succinic anhydride, petroleum resin based size, epichlorohydrin, cationic starch, acrylamide and the like can be used.

As the filler, clay, calcium carbonate, talc, titanium dioxide, synthetic silica or the like can be used.

Furthermore, a paper strong agent, a retention aid, a fixing agent, a dye and other papermaking auxiliaries can be added.

The inventors of the present invention found that in the recording method of the present invention, when recording is performed in such a manner that the ejection amount V (p1) of 11 droplets ejected from the recording head satisfies the relationship represented by formula (4), high quality images with little penetration to the back and with solid images sufficiently filled without any white portions left can be obtained in printing on plain paper.

$$2.5 \times 10^8/R^{2.6} \leq V \leq 6.0 \times 10^8/R^{2.6} \tag{4}$$

Where R is the density of the dotted droplets when recording is performed on a recording medium containing pulp fibers as the main component and having a sizing degree of 10 s or more and an air permeability of 5 to 50 s, which is represented by the number of dots with respect to the unit length in unit of dpi (=dot per inch).

In the case of an inkjet printer of a serial type, the dot density may be different between the scanning direction of the head (main scanning direction) and the sheet travel direction (secondary direction) in some cases, but it is preferable to use the value obtained by equalizing the number of dots per unit area in the main scanning direction to that in the secondary scanning direction.

The above-formula (4) is obtained experimentally as a result of examination of various recording liquids. The left side of formula (4) shows the relationship suitable to obtain a high image density without white stripes when solid images are formed on plain paper, and the right side shows the relationship suitable to prevent an increase in the optical density caused by penetration due to attachment of an excessive amount of the recording liquid and occurrence of bleeding.

Neither of the relationships can be satisfied without the excellent permeability on plain paper of the recording liquid of the present invention.

The recording liquid of the present invention provides images with high permeability and no bleeding, so that the recording liquid of the present invention can be applied to a high speed recording process, which was generally difficult.

In other words, in a recording method including ejecting and jetting a plurality of droplets of the recording liquid from the same outlet or separate outlets in such a manner that their pixel regions are at least partially overlapped on a recording medium to form images on the recording medium, the difference in the ejection time of two droplets of the recording liquid that overlap on the recording liquid is 0.125 ms or less, so that significantly high speed recording is possible.

Although in recent years, the technique regarding inkjet printers has achieved remarkable advancement, and the printing speed has been improved, in order to maintain high image quality to some extent, the dots in the adjacent positions are formed not continuously, but ink for one dot is not ejected to reach a sheet until ink for the other dot permeates in the sheet.

In other words, it can be said that by a method referred to as so-called multipass printing, high image quality is achieved while compromising the printing speed.

The recording liquid of the present invention exhibits significantly high permeability so that high image quality printing with a single pass that has not conventionally been achieved has become possible.

Fourthly, the present invention provides an inkjet recording apparatus including a recording liquid cartridge having a recording liquid reservoir containing a recording liquid; and a recording head for ejecting recording droplets, or an inkjet recording apparatus including a recording liquid cartridge including a recording liquid reservoir containing a recording liquid and a recording head for ejecting droplets of the recording liquid, wherein the recording cartridge is the second recording cartridge.

A recording liquid cartridge having a recording liquid reservoir containing the recording liquid of the present invention and an inkjet recording apparatus provided with the recording liquid cartridge will be described with reference to the accompanying drawings. However, the following is only an example, and the present invention is not limited thereto.

FIG. 1 is a schematic front view of a mechanism portion of a serial type inkjet recording apparatus including an ink cartridge provided with a recording liquid reservoir containing the recording liquid of the present invention.

In the mechanism portion of this inkjet recording apparatus, a main supporting guide rod 3 and a secondary supporting guide rod 4 are substantially horizontally suspended in a lateral direction between side plates 1 and 2 on both sides, and a carriage unit 5 is slidably supported in a main scanning direction with the main supporting guide rod 3 and the secondary supporting guide rod 4.

In the carriage unit 5, four heads 6 each of which ejects yellow (Y) ink, magenta (M) ink, cyan (C) ink, and black (Bk) ink are mounted in such a manner that their ejection faces (nozzle faces) 6a face downward. On the upper side of the heads 6 of the carriage unit 5, four ink cartridges 7y, 7m, 7c, and 7k, which are ink suppliers for supplying ink to the corresponding head of the four heads 6 are mounted exchangeably.

The carriage unit 5 is coupled to a timing belt 11 tightly extended between a driving pulley (driving timing-pulley) 9 rotated by a main motor 8 and a driven pulley (idler pulley) 10, and controls the driving of the main scanning motor 8 so that the carriage 5, that is, the four heads 6 are moved in the main scanning direction.

Furthermore, subframes 13 and 14 are provided on a bottom plate 12 connecting the side plates 1 and 2, and a feeding roller 15 for conveying a sheet 16 in a secondary scanning direction orthogonal to the main scanning direction is rotatably supported between the subframes 13 and 14.

A secondary scanning motor 17 is provided to the side of the subframe 14. In order to transmit the rotation of the secondary scanning-motor 17 to the feeding roller 15, a gear 18 fixed to the rotation axis of the secondary motor 17 and a gear 19 fixed to the axis of the feeding roller 15 are provided.

Moreover, a reliability maintenance and recovery mechanism of the head 6 (hereinafter, referred to as "subsystem") 21 is disposed between the side plate 1 and the subframe 13.

The subsystem 21 has the following configuration. Four capping means 22 for capping the corresponding ejection-faces of the heads 6 are supported with a holder 23, and the holder 23 is slidably supported with link members 24. When the carriage unit 5 moves in the main scanning direction and is brought in contact with an engagement portion 25, the holder 23 is lifted up in accordance with the movement of the carriage unit 5, and the capping means 22 cap the ejection faces 6a of the inkjet head 6. When the carriage unit 5 moves to the side of the printing region, the holder 23 is brought down in accordance with the movement of the carriage unit 5, and the capping means 22 come apart from the ejection faces 6a of the inkjet head 6.

The capping means 22 are connected to a suction pump 27 through a suction tube 26 and has an air opening so as to be in communication with air through an air open tube and an air open bulb.

The suction pump 27 drains drawn waste liquid to a waste-liquid tank (not shown) through a drain tube or the like.

Furthermore, on the side of the holder 23, a wiper blade 28, which is wiping means made of a fiber material, a foaming material or an elastic material such as rubber for wiping the ejection faces 6a of the inkjet head 6 is attached to a blade arm 29. The blade arm 29 is swingably supported by an axis and is swung by the rotation of a cam pivoted by driving means (not shown).

Next, the recording liquid cartridge 7 will be described with reference to FIGS. 2 and 3.

FIG. 2 is a perspective view of the appearance of the recording liquid cartridge before being mounted to a recording apparatus. FIG. 3 is a front cross-section view of the recording liquid cartridge.

As shown in FIG. 3, the recording liquid cartridge 7 contains an ink absorber 42 that absorbs ink of a necessary color in a cartridge body 41.

The cartridge body 41 is formed by attaching or welding a lid member 44 to an upper opening of a case 43 having the wide opening in the upper portion, and is made of, for example, a resin molded article.

The ink absorber 42 is made of a porous material such as urethane foam, and after it is compressed and inserted in the cartridge body 41, ink is absorbed.

An ink-supply port 45 from which ink is supplied to the recording head 6 is formed in the bottom portion of the case 43 of the cartridge body 41, and a seal ring 46 is engaged in the inner circumference face of the ink supply port 45.

The lid member 44 has an air opening 47.

The cartridge body 41 before being mounted is provided with a capping member 50 for closing the ink supply port 45 and preventing ink inside from leaking, which might occur when the case 43 is compressed or deformed by pressure applied to the wide side wall during the handling of cartridge at the time of mounting or transport or during vacuum packaging.

As shown in FIG. 2, the air opening 47 is sealed by attaching a film-like sealing member 55 having an oxygen permeability of 100 ml/m$^2$ or more to the lid member 44.

The sealing member 55 has a size sufficient to seal the air opening 47 and a plurality of grooves 48 formed on the periphery thereof.

Sealing the air opening 47 with the sealing member 55 having an oxygen permeability of 100 ml/m² or more in this manner has the following advantages. Provided that the ink cartridge 7 is packaged with a packaging material such as non-permeable aluminum laminate film under a vacuum pressure, even if gas is present in the ink due to the air in a space A (see FIG. 3) between the ink absorber 42 and the cartridge body 41 or when filling ink, the air in the ink is exhausted to the space between the cartridge body 41 having a high degree of vacuum and the packaging material outside the cartridge body 41 through sealing member 55, so that degasification of the ink can be improved.

FIG. 4 shows an example of the configuration of the recording liquid cartridge provided with a recording liquid reservoir containing the recording liquid of the present invention and a head portion for ejecting droplets of the recording liquid.

More specifically, a recording unit 30 is a serial type, and the main part thereof includes an inkjet head 6, an ink tank 41 containing the recording liquid that is to be supplied to the inkjet head 6, and a lid member for sealing the ink tank 41.

The inkjet head 6 is provided with multiple nozzles 32 for ejecting the recording liquid.

The recording liquid is guided from the ink tank 41 to a shared liquid compartment (not shown) through an ink supply tube (not shown), and ejected from the nozzles 32 in response to an electric signal from the body of the recording apparatus that is input from an electrode 31.

The recording unit of this type has a configuration suitable to heads of the type employing thermal energy as the driving power source and referred to as "thermal system" or "bubble system" from the structural viewpoint, which can be produced at low cost.

In the recording method of the thermal system or the bubble system, the recording liquid of the present invention has an improvement in the wettability to the thermal elements by adding the polyol (A). Therefore, even a small amount thereof can provide ejection stability and frequency stability and high safety, and thus, the present invention provides advantages.

The serial type inkjet recording apparatus has been described above. However, the recording liquid of the present invention can be applied to a recording apparatus having a so-called line head where nozzles are integrated at a density of the same resolution as or about a fraction of the resolution of desired images in any arrangement such as zigzag and are arranged in a width more than that of the recording medium.

The recording apparatus herein refers to not only output printers for PCs or digital cameras, but also apparatuses having a complex function in combination with fax machines, scanners, telephones and the like.

Fifthly, the present invention provides a recording medium on which images are recorded with the first recording liquid and that contains pulp fibers as the main component and has a sizing degree of 10 s or more and a water vapor permeability of 5 to 50 S. The present invention also provides a recording medium used in the third recording method or the fourth recording apparatus that contains pulp fibers as the main component and has a sizing degree of 10 s or more and a water vapor permeability of 5 to 50 S.

The pulp, the sizing degree and the water vapor permeability are the same as those that have been described with regard to the third recording method, and the papermaking method, the sizing agent, and the filler, the papermaking auxiliaries are the same as above.

DESCRIPTION OF THE PREFERRED EMBODIMENTS

EXAMPLES

Figure 1:
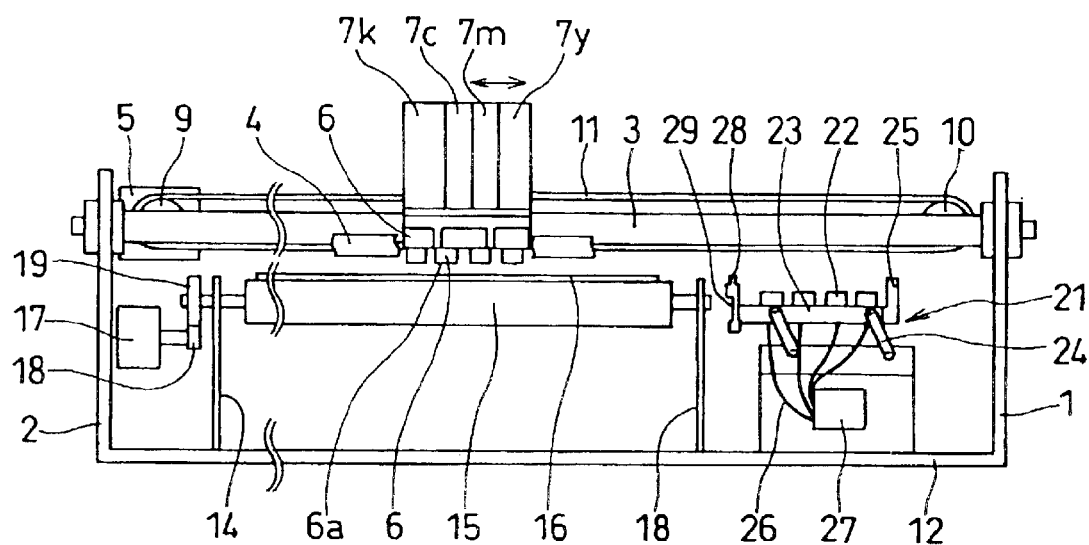
FIG. 1 is a schematic front view showing an example of the configuration of a serial type inkjet recording apparatus on which an ink cartridge containing a recording liquid according to the present invention is mounted.
Figure 2:
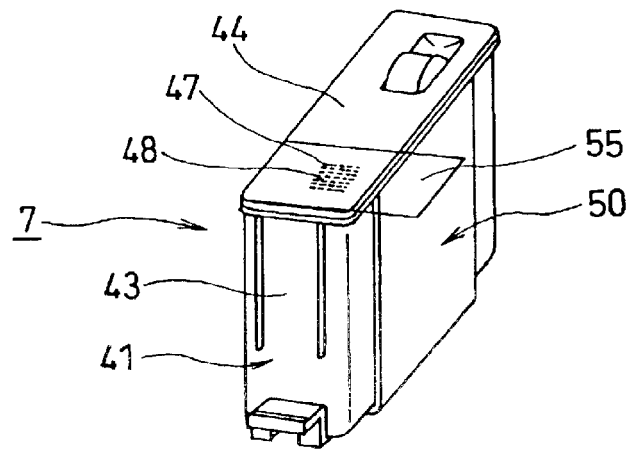
FIG. 2 is a perspective view of the appearance of the ink cartridge before being mounted in the recording apparatus.
Figure 3:
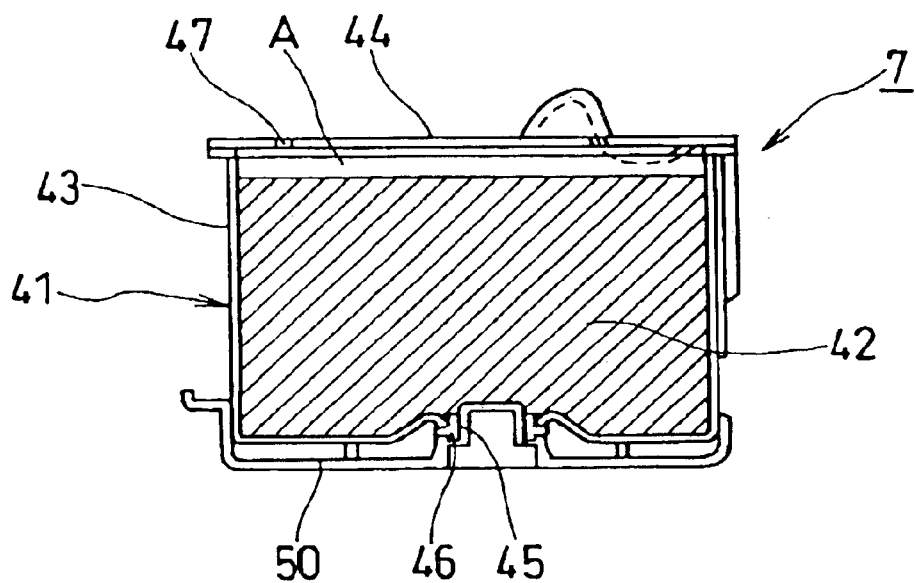
FIG. 3 is a front cross-sectional view of the ink cartridge.
Figure 4:
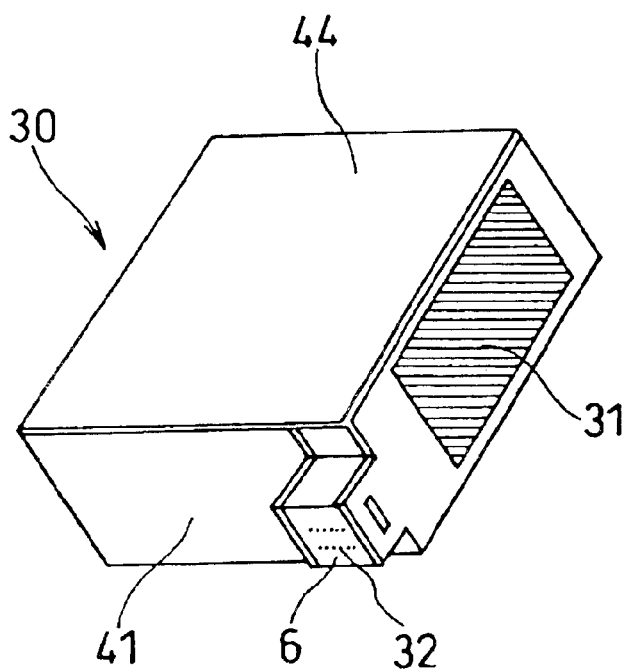
FIG. 4 is a perspective view of the appearance of a recording unit integrally formed with a recording head.

Hereinafter, the present invention will be described more specifically by way of example. However, the present invention is not limited by the following examples.

In the following compositions, "%" indicates the percentage based on the weight.

Example 1

The materials in the following composition were mixed and stirred, and then the pH was adjusted to 8 with a 10% aqueous solution of lithium hydroxide.

Then, the mixture was filtrated with a membrane filter having an average pore size of 0.1 µm, and thus a recording liquid (ink 1) was obtained.

| [ink 1] | |
|---|---|
| C.I. Direct Black 168 | 4% |
| Glycerin | 5% |
| ethylene glycol | 5% |
| compound (1)-4 | 0.3% |
| 2-ethyl-1,3-hexanediol | 1% |
| ion exchanged water | balance |

Example 2

A recording liquid (ink 2) was obtained in the same manner as in Example 1 except that the following composition was used and the pH was adjusted to 7.5 with lithium hydroxide.

| [ink 2] | |
|---|---|
| C.I. Direct Yellow 142 | 3.0% |
| Thiodiglycol | 8% |
| compound (1)-5 | 0.5% |
| 2,2,4-trimethyl-1,3-pentanediol | 3% |
| ion exchanged water | balance |

Example 3

A recording liquid (ink 3) was obtained in the same manner as in Example 1 except that the following composition was used and the pH was adjusted to 8.

| [ink 3] | |
|---|---|
| C.I. Direct Red 227 | 3% |
| Thiodiglycol | 8% |
| compound (1)-6 | 0.5% |
| 2-ethyl-1,3-hexanediol | 2% |
| ion exchanged water | balance |

Example 4

A recording liquid (ink 4) was obtained in the same manner as in Example 1 except that the following composition was used and the pH was adjusted to 9.

| [ink 4] | |
|---|---|
| C.I. Direct Blue 199 | 3% |
| Thiodiglycol | 8% |
| compound (1)-5 | 0.5% |
| 2,2,4-trimethyl-1,3-pentanediol | 3% |
| ion exchanged water | balance |

Example 5

First, carbon black was dispersed with a bead mill in the following formulation for pigment dispersing liquid 1.

The obtained pigment dispersing liquid 1 was mixed with other materials in the following formulation and the mixture was stirred, and then the pH was adjusted to 8 with a 10% aqueous solution of lithium hydroxide.

Then, the mixture was filtrated with a membrane filter having an average pore size of 0.8 μm, and thus a recording liquid (ink 5) was obtained.

| [pigment dispersing liquid 1] | |
|---|---|
| carbon black (average particle size of 104 nm) | 15% |
| styrene-acrylate- methacrylic acid diethanolamine salt copolymer | 3% |
| ion exchanged water | balance |
| [ink 5] | |
| pigment dispersing liquid 1 | 33.3% |
| diethylene glycol | 6.5% |
| glycerin | 3.5% |
| compound (1)-1 | 0.3% |
| compound (1)-3 | 0.1% |
| 2-ethyl-1,3-hexanediol | 2% |
| 2-pyrrolidone | 2% |
| ion exchanged water | balance |

Example 6

A pigment dispersing liquid 2 was prepared in the same manner as in Example 5 except that the following composition was used, and a recording liquid (ink 6) was obtained with this pigment dispersing liquid 2.

| [pigment dispersing liquid 2] | |
|---|---|
| carbon black (average particle size of 104 nm) | 15% |
| styrene-acrylate- methacrylic acid diethanolamine salt copolymer | 3% |
| ion exchanged water | balance |
| [ink 6] | |
| pigment dispersing liquid 2 | 33.3% |
| ethylene glycol | 6.5% |
| N-methyl-2-pyrrolidone | 3.5% |
| compound (1)-1 | 0.3% |
| 2,2,4-trimethyl-1,3-pentanediol | 3% |
| 2-pyrrolidone | 2% |
| fluorinated alkyl ester; nonionic surfactant | 0.3% |
| ion exchanged water | balance |

Example 7

A pigment dispersing liquid 3 was prepared in the same manner as in Example 5 except that the following composition was used, and a recording liquid (ink 7) was obtained with this pigment dispersing liquid 3.

| [pigment dispersing liquid 3] | |
|---|---|
| carbon black (average particle size of 99 nm) | 15% |
| formalin condensation product of naphthalene sulfonate | 3% |
| ion exchanged water | balance |
| [ink 7] | |
| pigment dispersing liquid 3 | 33.3% |
| polyethylene glycol (molecular weight of 200) | 15% |
| compound (1)-3 | 0.05% |
| 2-ethyl-1,3-hexanediol | 5% |
| fluorinated alkyl ester; nonionic surfactant | 0.3% |
| ion exchanged water | balance |

Example 8

A pigment dispersing liquid 4 was prepared in the same manner as in Example 5 except that the following composition was used, and a recording liquid (ink 8) was obtained with this pigment dispersing liquid 4

| [pigment dispersing liquid 4] | |
|---|---|
| C.I. Pigment Yellow 13 (average particle size of 117 nm) | 15% |
| styrene-acrylate- methacrylic acid diethanolamine salt copolymer | 3% |
| ion exchanged water | balance |
| [ink 8] | |
| pigment dispersing liquid 4 | 33.3% |
| glycerin | 5% |
| diethylene glycol | 10% |
| compound (1)-2 | 0.3% |
| 2,2,4-trimethyl-1,3-pentanediol | 3% |
| 2-pyrrolidone | 2% |
| ion exchanged water | balance |

Example 9

A pigment dispersing liquid 5 was prepared in the same manner as in Example 5 except that the following composition was used, and a recording liquid (ink 9) was obtained with this pigment dispersing liquid 5.

| [pigment dispersing liquid 5] | |
|---|---|
| C.I. Pigment Yellow 74 (average particle size of 96 nm) | 15% |
| formalin condensation product of naphthalene sulfonate | 3% |
| ion exchanged water | balance |
| [ink 9] | |
| pigment dispersing liquid 5 | 33.3% |
| polyethylene glycol (molecular weight of 200) | 10% |
| compound (1)-7 | 0.05% |
| 2-ethyl-1,3-hexanediol | 5% |
| ion exchanged water | balance |

Example 10

A pigment dispersing liquid 6 was prepared in the same manner as in Example 5 except that the following composition was used, and a recording liquid (ink 10) was obtained with this pigment dispersing liquid 6.

| [pigment dispersing liquid 6] | |
|---|---|
| C.I. Pigment Red 122 (average particle size of 120 nm) | 15% |
| styrene-acrylate- methacrylic acid diethanolamine salt copolymer | 3% |
| ion exchanged water | balance |
| [ink 10] | |
| pigment dispersing liquid 6 | 33.3% |
| glycerin | 5% |
| ethylene glycol | 10% |
| compound (1)-1 | 0.3% |
| 2-ethyl-1,3-hexanediol | 2% |
| 2-pyrrolidone | 2% |
| ion exchanged water | balance |

Example 11

A pigment dispersing liquid 7 was prepared in the same manner as in Example 5 except that the following composition was used, and a recording liquid (ink 11) was obtained with this pigment dispersing liquid 7.

| [pigment dispersing liquid 7] | |
|---|---|
| C.I. Pigment Red 57:1 (average particle size of 115 nm) | 15% |
| formalin condensation product of naphthalene sulfonate | 3% |
| ion exchanged water | balance |
| [ink 11] | |
| pigment dispersing liquid 7 | 33.3% |
| polyethylene glycol (molecular weight of 200) | 10% |
| compound (1)-2 | 0.05% |
| 2,2,4-trimethyl-1,3-pentanediol | 1% |
| 2-ethyl-1,3-hexanediol | 1% |
| 2-pyrrolidone | 2% |
| ion exchanged water | balance |

Example 12

A pigment dispersing liquid 8 was prepared in the same manner as in Example 5 except that the following composition was used, and a recording liquid (ink 12) was obtained with this pigment dispersing liquid 8.

| [pigment dispersing liquid 8] | |
|---|---|
| C.I. Pigment Blue 15:3 (average particle size of 123 nm) | 15% |
| styrene-acrylate- methacrylic acid diethanolamine salt copolymer | 3% |
| ion exchanged water | balance |
| [ink 12] | |
| pigment dispersing liquid 8 | 33.3% |
| glycerin | 3% |
| 1,5-pentanediol | 15% |
| compound (1)-4 | 0.3% |
| 2,2,4-trimethyl-1,3-pentanediol | 5% |
| 2-pyrrolidone | 2% |
| ion exchanged water | balance |

Example 13

A pigment dispersing liquid 9 was prepared in the same manner as in Example 5 except that the following composition was used, and a recording liquid (ink 13) was obtained with this pigment dispersing liquid 9.

| [pigment dispersing liquid 9] | |
|---|---|
| C.I. Pigment Blue 56 (average particle size of 138 nm) | 15% |
| formalin condensation product of naphthalene sulfonate | 3% |
| ion exchanged water | balance |
| [ink 13] | |
| pigment dispersing liquid 9 | 33.3% |
| polyethylene glycol (molecular weight of 200) | 10% |
| compound (1)-5 | 0.05% |
| 2-ethyl-1,3-hexanediol | 4% |
| triethylene glycol monobutyl ether | 2% |
| ion exchanged water | balance |

Example 14

A recording liquid (ink 14) was obtained in the same manner as in Example 1 except that the following composition was used.

| [ink 14] | |
|---|---|
| carbon black dispersing liquid with carboxyl group bond (solid content of 16.4 wt. %, average particle size of 128 nm) | 33.3% |
| diethylene glycol | 15% |
| glycerin | 5% |
| compound (1)-1 | 2% |
| 2-ethyl-1,3-hexanediol | 2% |
| N-methyl-2-pyrrolidone | 2% |
| ion exchanged water | balance |

Example 15

A recording liquid (ink 15) was obtained in the same manner as in Example 1 except that the following composition was used.

[ink 15]

| | |
|---|---:|
| carbon black dispersing liquid with carboxyl group bond (solid content of 16.4 wt. %, average particle size of 128 nm) | 33.3% |
| ethylene glycol | 15% |
| compound (1)-1 | 1% |
| 2,2,4-trimethyl-1,3-pentanediol | 3% |
| N-methyl-2-pyrrolidone | 2% |
| ion exchanged water | balance |

Example 16

A recording liquid (ink 16) was obtained in the same manner as in Example 1 except that the following composition was used.

[ink 16]

| | |
|---|---:|
| carbon black dispersing liquid with sulfonic group bond (solid content of 18 wt. %, average particle size of 132 nm) | 33% |
| 1,5-pentanediol | 5% |
| N-methyl-2-pyrrolidone | 2% |
| compound (1)-6 | 1% |
| 2-ethyl-1,3-hexanediol | 1% |
| ion exchanged water | balance |

Example 17

A recording liquid (ink 17) was obtained in the same manner as in Example 1 except that the following composition was used.

[ink 17]

| | |
|---|---:|
| carbon black dispersing liquid with sulfonic group bond (solid content of 18 wt. %, average particle size of 132 nm) | 33% |
| 1,5-pentanediol | 5% |
| N-methyl-2-pyrrolidone | 2% |
| compound (1)-1 | 1% |
| 2,2,4-trimethyl-1,3-pentanediol | 1.5% |
| ion exchanged water | balance |

Example 18

A pigment dispersing liquid 10 was prepared in the same manner as in Example 5 except that the following composition was used, and a recording liquid (ink 18) was obtained with this pigment dispersing liquid 10.

[pigment dispersing liquid 10]

| | |
|---|---:|
| carbon black (average particle size of 53 nm) | 15% |
| styrene-acrylate- methacrylic acid diethanolamine salt copolymer | 3% |
| ion exchanged water | balance |

[ink 18]

| | |
|---|---:|
| pigment dispersing liquid 10 | 33.3% |
| polyethylene glycol (molecular weight of 200) | 5% |
| ethylene glycol | 30% |
| compound (1)-5 | 0.01% |
| 2-ethyl-1,3-hexanediol | 10% |
| ion exchanged water | balance |

Example 19

A pigment dispersing liquid 11 was prepared in the same manner as in Example 5 except that the following composition was used, and a recording liquid (ink 19) was obtained with this pigment dispersing liquid 11.

[pigment dispersing liquid 11]

| | |
|---|---:|
| carbon black (average particle size of 196 nm) | 15% |
| styrene-acrylate- methacrylic acid diethanolamine salt copolymer | 3% |
| ion exchanged water | balance |

[ink 19]

| | |
|---|---:|
| pigment dispersing liquid 11 | 33.3% |
| 1,5-pentanediol | 5% |
| N-methyl-2-pyrrolidone | 6.5% |
| compound (1)-3 | 10% |
| 2,2,4-trimethyl-1,3-pentanediol | 5% |
| ion exchanged water | balance |

Example 20

A recording liquid (ink 20) was obtained in the same manner as in Example 1 except that the following composition was used, and the pH was adjusted to 8 with sodium hydroxide.

[ink 20]

| | |
|---|---:|
| C.I. Direct Black 168 | 4% |
| Glycerin | 5% |
| ethylene glycol | 5% |
| compound (2)-4 | 0.3% |
| 2-ethyl-1,3-hexanediol | 1% |
| ion exchanged water | balance |

Example 21

A recording liquid (ink 21) was obtained in the same manner as in Example 1 except that the following composition was used, and the pH was adjusted to 7.5 with sodium hydroxide.

[ink 21]

| | |
|---|---:|
| C.I. Direct Yellow 142 | 3.0% |
| Thiodiglycol | 8% |
| compound (2)-1 | 0.5% |
| 2,2,4-trimethyl-1,3-pentanediol | 3% |
| ion exchanged water | balance |

Example 22

A recording liquid (ink 22) was obtained in the same manner as in Example 1 except that the following composition was used, and the pH was adjusted to 8 with sodium hydroxide.

[ink 22]

| C.I. Direct Red 227 | 3% |
|---|---|
| Thiodiglycol | 8% |
| compound (2)-5 | 0.5% |
| 2-ethyl-1,3-hexanediol | 2% |
| ion exchanged water | balance |

Example 23

A recording liquid (ink 23) was obtained in the same manner as in Example 1 except that the following composition was used, and the pH was adjusted to 9 with sodium hydroxide.

[ink 23]

| C.I. Direct Blue 199 | 3% |
|---|---|
| Thiodiglycol | 8% |
| compound (2)-3 | 0.5% |
| 2,2,4-trimethyl-1,3-pentanediol | 3% |
| ion exchanged water | balance |

Example 24

A pigment dispersing liquid 12 was prepared in the same manner as in Example 5 except that the following composition was used, and a recording liquid (ink 24) was obtained with this pigment dispersing liquid 12.

[pigment dispersing liquid 12]

| carbon black (average particle size of 104 nm) | 15% |
|---|---|
| styrene-acrylate- methacrylic acid diethanolamine salt copolymer | 3% |
| ion exchanged water | balance |

[ink 24]

| pigment dispersing liquid 12 | 33.3% |
|---|---|
| diethylene glycol | 6.5% |
| glycerin | 3.5% |
| compound (2)-1 | 0.3% |
| compound (2)-4 | 0.1% |
| 2-ethyl-1,3-hexanediol | 2% |
| 2-pyrrolidone | 2% |
| ion exchanged water | balance |

Example 25

A pigment dispersing liquid 13 was prepared in the same manner as in Example 5 except that the following composition was used, and a recording liquid (ink 25) was obtained with this pigment dispersing liquid 13.

[pigment dispersing liquid 13]

| carbon black (average particle size of 104 nm) | 15% |
|---|---|
| styrene-acrylate- methacrylic acid diethanolamine salt copolymer | 3% |
| ion exchanged water | balance |

[ink 25]

| pigment dispersing liquid 13 | 33.3% |
|---|---|
| ethylene glycol | 6.5% |
| N-methyl-2-pyrrolidone | 3.5% |
| compound (2)-3 | 0.3% |
| 2,2,4-trimethyl-1,3-pentanediol | 3% |
| 2-pyrrolidone | 2% |
| fluorinated alkyl ester; nonionic surfactant | 0.3% |
| ion exchanged water | balance |

Example 26

A pigment dispersing liquid 14 was prepared in the same manner as in Example 5 except that the following composition was used, and a recording liquid (ink 26) was obtained with this pigment dispersing liquid 14.

[pigment dispersing liquid 14]

| carbon black (average particle size of 99 nm) | 15% |
|---|---|
| formalin condensation product of naphthalene sulfonate | 3% |
| ion exchanged water | balance |

[ink 26]

| pigment dispersing liquid 14 | 33.3% |
|---|---|
| polyethylene glycol (molecular weight of 200) | 15% |
| compound (2)-1 | 0.05% |
| 2-ethyl-1,3-hexanediol | 5% |
| fluorinated alkyl ester; nonionic surfactant | 0.3% |
| ion exchanged water | balance |

Example 27

A pigment dispersing liquid 15 was prepared in the same manner as in Example 5 except that the following composition was used, and a recording liquid (ink 27) was obtained with this pigment dispersing liquid 15.

[pigment dispersing liquid 15]

| C.I. Pigment Yellow 13 (average particle size of 117 nm) | 15% |
|---|---|
| styrene-acrylate- methacrylic acid diethanolamine salt copolymer | 3% |
| ion exchanged water | balance |

[ink 27]

| pigment dispersing liquid 15 | 33.3% |
|---|---|
| glycerin | 5% |
| diethylene glycol | 10% |
| compound (2)-5 | 0.3% |
| 2,2,4-trimethyl-1,3-pentanediol | 3% |
| 2-pyrrolidone | 2% |
| ion exchanged water | balance |

Example 28

A pigment dispersing liquid 16 was prepared in the same manner as in Example 5 except that the following composition was used, and a recording liquid (ink 28) was obtained with this pigment dispersing liquid 16.

| [pigment dispersing liquid 16] | |
|---|---|
| C.I. Pigment Yellow 74 (average particle size of 96 nm) | 15% |
| formalin condensation product of naphthalene sulfonate | 3% |
| ion exchanged water | balance |
| [ink 28] | |
| pigment dispersing liquid 16 | 33.3% |
| polyethylene glycol (molecular weight of 200) | 10% |
| compound (2)-4 | 0.05% |
| 2-ethyl-1,3-hexanediol | 5% |
| ion exchanged water | balance |

Example 29

A pigment dispersing liquid 17 was prepared in the same manner as in Example 5 except that the following composition was used, and a recording liquid (ink 29) was obtained with this pigment dispersing liquid 17.

| [pigment dispersing liquid 17] | |
|---|---|
| C.I. Pigment Red 122 (average particle size of 120 nm) | 15% |
| styrene-acrylate- methacrylic acid diethanolamine salt copolymer | 3% |
| ion exchanged water | balance |
| [ink 29] | |
| pigment dispersing liquid 17 | 33.3% |
| glycerin | 5% |
| ethylene glycol | 10% |
| compound (2)-2 | 0.3% |
| 2-ethyl-1,3-hexanediol | 2% |
| 2-pyrrolidone | 2% |
| ion exchanged water | balance |

Example 30

A pigment dispersing liquid 18 was prepared in the same manner as in Example 5 except that the following composition was used, and a recording liquid (ink 30) was obtained with this pigment dispersing liquid 18.

| [pigment dispersing liquid 18] | |
|---|---|
| C.I. Pigment Red 57:1 (average particle size of 115 nm) | 15% |
| formalin condensation product of naphthalene sulfonate | 3% |
| ion exchanged water | balance |
| [ink 30] | |
| pigment dispersing liquid 18 | 33.3% |
| polyethylene glycol (molecular weight of 200) | 10% |
| compound (2)-5 | 0.05% |
| 2,2,4-trimethyl-1,3-pentanediol | 1% |
| 2-ethyl-1,3-hexanediol | 1% |
| 2-pyrrolidone | 2% |
| ion exchanged water | balance |

Example 31

A pigment dispersing liquid 19 was prepared in the same manner as in Example 5 except that the following composition was used, and a recording liquid (ink 31) was obtained with this pigment dispersing liquid 19.

| [pigment dispersing liquid 19] | |
|---|---|
| C.I. Pigment Blue 15:3 (average particle size of 123 nm) | 15% |
| styrene-acrylate- methacrylic acid diethanolamine salt copolymer | 3% |
| ion exchanged water | balance |
| [ink 31] | |
| pigment dispersing liquid 19 | 33.3% |
| glycerin | 3% |
| 1,5-pentanediol | 15% |
| compound (2)-5 | 0.3% |
| 2,2,4-trimethyl-1,3-pentanediol | 5% |
| 2-pyrrolidone | 2% |
| ion exchanged water | balance |

Example 32

A pigment dispersing liquid 20 was prepared in the same manner as in Example 5 except that the following composition was used, and a recording liquid (ink 32) was obtained with this pigment dispersing liquid 20.

| [pigment dispersing liquid 20] | |
|---|---|
| C.I. Pigment Blue 56 (average particle size of 138 nm) | 15% |
| formalin condensation product of naphthalene sulfonate | 3% |
| ion exchanged water | balance |
| [ink 32] | |
| pigment dispersing liquid 20 | 33.3% |
| polyethylene glycol (molecular weight of 200) | 10% |
| compound (2)-4 | 0.05% |
| 2-ethyl-1,3-hexanediol | 4% |
| triethylene glycol monobutyl ether | 2% |
| ion exchanged water | balance |

Example 33

A recording liquid (ink 33) was obtained in the same manner as in Example 1 except that the following composition was used.

| [ink 33] | |
|---|---|
| carbon black dispersing liquid with carboxyl group bond (solid content of 16.4 wt. %, average particle size of 128 nm) | 33.3% |
| diethylene glycol | 15% |
| glycerin | 5% |
| compound (2)-1 | 2% |
| 2-ethyl-1,3-hexanediol | 2% |
| N-methyl-2-pyrrolidone | 2% |
| ion exchanged water | balance |

Example 34

A recording liquid (ink 34) was obtained in the same manner as in Example 1 except that the following composition was used.

[ink 34]

| | |
|---|---|
| carbon black dispersing liquid with carboxyl group bond (solid content of 16.4 wt. %, average particle size of 128 nm) | 33.3% |
| ethylene glycol | 15% |
| compound (2)-1 | 1% |
| 2,2,4-trimethyl-1,3-pentanediol | 3% |
| N-methyl-2-pyrrolidone | 2% |
| ion exchanged water | balance |

Example 35

A recording liquid (ink 35) was obtained in the same manner as in Example 1 except that the following composition was used.

[ink 35]

| | |
|---|---|
| carbon black dispersing liquid with sulfonic group bond (solid content of 18 wt. %, average particle size of 132 nm) | 33% |
| 1,5-pentanediol | 5% |
| N-methyl-2-pyrrolidone | 2% |
| compound (2)-3 | 1% |
| 2-ethyl-1,3-hexanediol | 1% |
| ion exchanged water | balance |

Example 36 A recording liquid (ink 36) was obtained in the same manner as in Example 1 except that the following composition was used.

[ink 36]

| | |
|---|---|
| carbon black dispersing liquid with sulfonic group bond (solid content of 18 wt. %, average particle size of 132 nm) | 33% |
| 1,5-pentanediol | 5% |
| N-methyl-2-pyrrolidone | 2% |
| compound (2)-2 | 1% |
| 2,2,4-trimethyl-1,3-pentanediol | 1.5% |
| ion exchanged water | balance |

Example 37

A pigment dispersing liquid 21 was prepared in the same manner as in Example 5 except that the following composition was used, and a recording liquid (ink 37) was obtained with this pigment dispersing liquid 21.

[pigment dispersing liquid 21]

| | |
|---|---|
| carbon black (average particle size of 53 nm) | 15% |
| styrene-acrylate- methacrylic acid diethanolamine salt copolymer | 3% |
| ion exchanged water | balance |

[ink 37]

| | |
|---|---|
| pigment dispersing liquid 21 | 33.3% |
| polyethylene glycol (molecular weight of 200) | 5% |
| ethylene glycol | 30% |
| compound (2)-5 | 0.01% |
| 2-ethyl-1,3-hexanediol | 10% |
| ion exchanged water | balance |

Example 38

A pigment dispersing liquid 22 was prepared in the same manner as in Example 5 except that the following composition was used, and a recording liquid (ink 38) was obtained with this pigment dispersing liquid 22.

[pigment dispersing liquid 22]

| | |
|---|---|
| carbon black (average particle size of 196 nm) | 15% |
| styrene-acrylate- methacrylic acid diethanolamine salt copolymer | 3% |
| ion exchanged water | balance |

[ink 38]

| | |
|---|---|
| pigment dispersing liquid 22 | 33.3% |
| 1,5-pentanediol | 5% |
| N-methyl-2-pyrrolidone | 6.5% |
| compound (2)-3 | 10% |
| 2,2,4-trimethyl-1,3-pentanediol | 5% |
| ion exchanged water | balance |

Comparative Example 1

A recording liquid (ink 39) was prepared in the same manner as in Example 5 except that 2-ethyl-1,3-hexanediol was replaced by an equal amount of ion exchanged water.

Comparative Example 2

A recording liquid (ink 40) was prepared in the same manner as in Example 25 except that 2,2,4-trimethyl-1,3-pentanediol was replaced by an equal amount of ion exchanged water.

Comparative Example 3

A recording liquid (ink 41) was prepared in the same manner as in Example 5 except that instead of 2-ethyl-1,3-hexanediol, the compound (1)-1 was further added such that the amount thereof was 2 wt. %, and the remaining amount was for ion exchanged water.

Comparative Example 4

A recording liquid (ink 42) was prepared in the same manner as in Example 6 except that 2,2,4-trimethyl-1,3-pentanediol was replaced by an equal amount of diethylene glycol monobutyl ether.

Comparative Example 5

A recording liquid (ink 43) was prepared in the same manner as in Example 10 except that 2-ethyl-1,3-hexanediol was replaced by an equal amount of diethylene glycol monobutyl ether.

Comparative Example 6

A recording liquid (ink 44) was prepared in the same manner as in Example 14 except that 2-ethyl-1,3-hexanediol was replaced by 10 wt. % of diethylene glycol monobutyl ether.

Comparative Example 7

A recording liquid (ink 45) was prepared in the same manner as in Example 24 except that 2-ethyl-1,3-hexanediol was replaced by an equal amount of 2-ethyl-2-methyl-1,3-propanediol.

Comparative Example 8

A recording liquid (ink 46) was prepared in the same manner as in Example 12 except that 2,2,4-trimethyl-1,3-pentanediol was replaced by an equal amount of 2,2-diethyl-1,3-propanediol.

Comparative Example 9

A recording liquid (ink 47) was prepared in the same manner as in Example 7 except that 2-ethyl-1,3-hexanediol was replaced by an equal amount of 3,3-dimethyl-1,2-butanediol.

Comparative Example 10

A recording liquid (ink 48) was prepared in the same manner as in Example 23 except that 2,2,4-trimethyl-1,3-pentanediol was replaced by an equal amount of 2,4-dimethyl-2,4-pentanediol.

Comparative Example 11

A recording liquid (ink 49) was prepared in the same manner as in Example 21 except that 2,2,4-trimethyl-1,3-pentanediol was replaced by an equal amount of 2,5-dimethyl-2,5-hexanediol.

Comparative Example 12

A recording liquid (ink 50) was prepared in the same manner as in Example 31 except that 2,2,4-trimethyl-1,3-pentanediol was replaced by an equal amount of 2-methyl-2-propyl-1,3-propanediol.

Comparative Example 13

A recording liquid (ink 51) was prepared in the same manner as in Example 33 except that 2-ethyl-1,3-hexanediol and the compound (2)-5 were replaced by 1,7-heptanediol in an amount equal to the total amount thereof.

Comparative Example 14

A recording liquid (ink 52) was prepared in the same manner as in Example 37 except that 2-ethyl-1,3-hexanediol was replaced by an equal amount of 2,6-heptanediol.

Comparative Example 15

A recording liquid (ink 53) was prepared in the same manner as in Example 2 except that 2,2,4-trimethyl-1,3-pentanediol was replaced by an equal amount of 3,3-dimethyl-1,5-pentanediol.

Comparative Example 16

A recording liquid (ink 54) was prepared in the same manner as in Example 8 except that 2,2,4-trimethyl-1,3-pentanediol was replaced by an equal amount of 3-ethyl-1,3-pentanediol.

Comparative Example 17

A recording liquid (ink 55) was prepared in the same manner as in Example 17 except that 2,2,4-trimethyl-1,3-pentanediol was replaced by an equal amount of 2,4-dimethyl-1,5-pentanediol.

Comparative Example 18

A recording liquid (ink 56) was prepared in the same manner as in Example 21 except that 2,2,4-trimethyl-1,3-pentanediol was replaced by an equal amount of 1,6-heptanediol.

Comparative Example 19

A recording liquid (ink 57) was prepared in the same manner as in Example 2 except that 2-ethyl-1,3-hexanediol was replaced by an equal amount of 2,7-octanediol.

Comparative Example 20

A recording liquid (ink 58) was prepared in the same manner as in Example 30 except that 2-ethyl-1,3-hexanediol and 2,2,4-trimethyl-1,3-pentanediol were replaced by 1,9-nonanediol in an amount equal to the total amount thereof

Comparative Example 21

A recording liquid (ink 59) was prepared in the same manner as in Example 9 except that 2-ethyl-1,3-hexanediol was replaced by an equal amount of 1,1,3,3-tetramethyl-1,3-propanediol.

Comparative Example 22

A recording liquid (ink 60) was prepared in the same manner as in Example 1 except that 2-ethyl-1,3-hexanediol was replaced by an equal amount of 1,10-decanediol.

Comparative Example 23

A recording liquid (ink 61) was prepared in the same manner as in Example 37 except that 2-ethyl-1,3-hexanediol was replaced by an equal amount of 3,8-decanediol.

Comparative Example 24

A recording liquid (ink 62) was prepared in the same manner as in Example 6 except that 2,2,4-trimethyl-1,3-pentanediol was replaced by an equal amount of 1,8-octanediol.

Comparative Example 25

A recording liquid (ink 63) was prepared in the same manner as in Example 14 except that 2-ethyl-1,3-hexanediol was replaced by an equal amount of 2,4,6-trimethyl-1,7-heptanediol.

Comparative Example 26

A recording liquid (ink 64) was prepared in the same manner as in Example 4 except that the compound (1)-5 was replaced by 6 wt. % of a compound represented by formula (4).

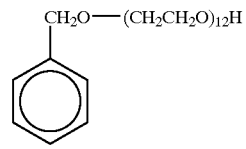

(4)

Comparative Example 27

The materials in the following composition were mixed and stirred, and then the pH was adjusted to 8 with a 10% aqueous solution of lithium hydroxide.

Then, the mixture was filtrated with a membrane filter having an average pore size of 0.1 μm, and thus a recording liquid (ink 65) was obtained.

| [ink 65] | |
|---|---|
| C. I. Acid Blue 234 | 2% |
| polyethylene glycol #200 | 10% |
| compound represented by formula (5) | 6% |
| 2-ethyl-1,3-hexanediol | 1% |
| ion exchanged water | balance |

(5)

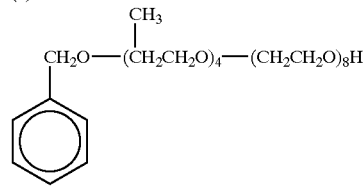

Comparative Example 28

A recording liquid (ink 66) was prepared in the same manner as in Example 5 except that the compounds (1)-1 and (1)-3 were replaced by ion exchanged water in an amount equal to the total amount thereof.

Comparative Example 29

A recording liquid (ink 67) was prepared in the same manner as in Example 5 except that the compounds (1)-1 and (1)-3 were replaced by 2-ethyl-1,3-hexanediol in an amount equal to the total amount thereof.

Comparative Example 30

A recording liquid (ink 68) was prepared in the same manner as in Example 15 except that the compound (1)-1 was replaced by an equal amount of 2,2,4-trimethyl-1,3-pentanediol.

Comparative Example 31

A recording liquid (ink 69) was prepared in the same manner as in Example 21 except that instead of 2,2,4-trimethyl-1,3-pentanediol, the compound (2)-1 was further added such that the amount thereof was 3 wt. %, and the remaining amount was for ion exchanged water.

Next, the following tests were conducted with respect to the inks obtained in the examples and the comparative examples.

The recording apparatuses (A), (B), and (C) as described below were used. Evaluation recording apparatus (A)

Inkjet printer with a piezo system having a plurality of nozzles, each of which ejects in an amount of 23 pl per droplet, and has a dot density of droplets on plain paper of 600 dpi as the maximum dot density. Evaluation recording apparatus (B)

Inkjet printer with a thermal system having a plurality of nozzles, each of which ejects in an amount of 4 pl per droplet from each nozzle, and has a dot density of droplets on plain paper of 1200 dpi as the maximum dot density. Evaluation recording apparatus (C)

Inkjet printer with a piezo system having 48 nozzles with a 360 dpi pitch that can control the ejection amount per droplet to either 4 pl, 7 pl, or 11 pl, and has a dot density of droplets on plain paper of 720 dpi as the maximum dot density.

(1) Vividness of Images

Letters are printed on My Paper (a sizing degree of 12 s and an air permeability of 16 s) manufactured by NBS Ricoh Co., Ltd as the recording medium, and after drying, the bleeding of the images, the tone, and the density were observed visually and measured with a reflection type color spectrophotometer/calorimeter/densitometer (manufactured by X-Rite) for integrated evaluation.

The criteria for evaluation were as follows.

VG: very good image quality
G: good image quality
S: mediocre image quality
P: poor image quality (2) Dryness of Images A paper filter was pressed onto printed solid images on the recording media at a pressure of 0.1 kg/cm$^2$ and the time until ink was no longer transferred to the paper filter was measured.

G: dried in less than 3 seconds
S: dried in 3 or more and not more than 20 seconds
P: dried in 20 or more seconds (3) Penetration to the Back Solid images are formed on the recording media such that the density with each ink color measured by a reflection type color spectrophotometer/calorimeter/densitometer (manufactured by X-Rite) is 1.0.

These images are visually observed from the back face for evaluation.

The evaluation criteria were as follows.

VG: The boundary between the solid images and white portions is completely indistinct and no problem is caused when letters are printed on both faces.
G: The boundary between the solid images and white portions is almost indistinct and no problem is caused when letters are printed on both faces.
S: The coloring agent of the solid images does not penetrate to the back, but the boundary between the solid images and white portions is slightly indistinct and no problem is caused when letters are printed on both faces.
P: The coloring agent of the solid images penetrates to the back, and images cannot be printed on both faces.

(4) Rubbing Properties

The images formed with each ink on the recording media were rubbed with fingers, cloth, an eraser, and a marking pen 30 seconds after printing, and how the images look was observed visually for evaluation.

The evaluation criteria were as follows.

VG: There is no change in the images in all the methods.
G: There is no change in the images in some methods.
S: There is slight change in the images in all the methods.
P: There is a change in the images in all the methods.

(5) Filling of Images

After drying, solid images were observed for evaluation.
The evaluation criteria were as follows.

VG: The recording medium is uniformly colored with ink even when observing enlarged images.
G: The recording medium is uniformly colored with ink as long as images are observed visually.
S: The recording medium is non-uniformly colored with ink even when images are observed visually.
P: The recording medium is colored with ink so non-uniformly that portions without color can be recognized on the surface of the medium at visual observation.

(6) Durability

The ink was stored at 60° C. for 7 days while being set to an inkjet printer. Then, evaluation was performed based on the cleaning operation of a conventionally known inkjet printer.

The evaluation criteria were as follows.

G: One operation permits restoration.
S: Restoration requires 2 to 5 operations.
P: More than 5 operations fail to restore.

Examples 39 to 58

Letters were printed on the following media using the ink obtained in Example 14 for evaluation.
Example 39: Xerox Paper R (sizing degree 8s, air permeability 20s) manufactured by Xerox Corporation
Example 40: REFLEX (sizing degree 25s, air permeability 4s) manufactured by AUSTRALIAN PAPER (Australia)
Example 41: NBS copying and printing paper 90K (sizing degree 60s, air permeability 68s) manufactured by NBS Ricoh Co., Ltd
Example 42: PB PAPER (sizing degree 21s, air permeability 8s) manufactured by Canon Inc.
Example 43: NBS copying and printing paper 45K (sizing degree 11s, air permeability 45s) manufactured by NBS Ricoh Co., Ltd.
Example 44: Yamayuri (sizing degree 12s, air permeability 21s) manufactured by Honshu Seishi Kabushiki Kaisha
Example 45: Shigen PPC paper type S (sizing degree 22s, air permeability 13s) manufactured by Ricoh Co., Ltd.
Example 46: Xerox P-paper (sizing degree 24s, air permeability 19s) manufactured by Xerox Corporation
Example 47: Multiace (sizing degree 25s, air permeability 17s) manufactured by Xerox Corporation
Example 48: Xerox 4024 paper (sizing degree 32s, air permeability 21s) manufactured by Xerox Corporation Letters were printed on the following media using the ink obtained in Example 24 for evaluation
Example 49: Xerox Paper R (sizing degree 8s, air permeability 20s) manufactured by Xerox Corporation
Example 50: REFLEX (sizing degree 25s, air permeability 4s) manufactured by AUSTRALIAN PAPER (Australia)
Example 51: NBS copying and printing paper 90K (sizing degree 60s, air permeability 68s) manufactured by NBS Ricoh Co., Ltd.
Example 52: PB PAPER (sizing degree 21s, air permeability 8s) manufactured by Canon Inc.
Example 53: NBS copying and printing paper 45K (sizing degree 11s, air permeability 45s) manufactured by NBS Ricoh Co., Ltd.
Example 54: Yamayuri (sizing degree 12s, air permeability 21s) manufactured by Honshu Seishi Kabushiki Kaisha
Example 55: Shigen PPC paper type S (sizing degree 22s, air permeability 13s) manufactured by Ricoh Co., Ltd.
Example 56: Xerox P-paper (sizing degree 24s, air permeability 19s) manufactured by Xerox Corporation
Example 57: Multiace (sizing degree 25s, air permeability 17s) manufactured by Xerox Corporation
Example: 58 Xerox 4024 paper (sizing degree 32s, air permeability 21s) manufactured by Xerox Corporation Tables 1 to 3 show the evaluation results described above.

TABLE 1

| | Evaluation equipment | 1) Vividness of images | 2) Dryness of images | 3) Penetration to the back | 4) Rubbing properties | 5) Filling of images | 6) Storage properties |
|---|---|---|---|---|---|---|---|
| Ex. 1 | (B) | G | G | S | VG | VG | G |
| Ex. 2 | (C) | G | G | S | VG | VG | G |
| Ex. 3 | (A) | G | G | S | VG | VG | G |
| Ex. 4 | (B) | G | G | S | VG | VG | G |
| Ex. 5 | (A) | VG | G | VG | G | VG | G |
| Ex. 6 | (C) | VG | G | VG | G | VG | G |
| Ex. 7 | (A) | G | G | G | G | G | G |
| Ex. 8 | (C) | VG | G | VG | G | VG | G |
| Ex. 9 | (B) | G | G | G | G | G | G |
| Ex. 10 | (A) | VG | G | VG | G | VG | G |
| Ex. 11 | (B) | G | G | G | G | VG | G |
| Ex. 12 | (C) | VG | G | VG | G | VG | G |
| Ex. 13 | (B) | G | G | G | G | G | G |
| Ex. 14 | (C) | VG | G | VG | G | G | G |
| Ex. 15 | (A) | VG | G | VG | G | VG | G |
| Ex. 16 | (B) | G | G | G | G | G | G |
| Ex. 17 | (A) | VG | G | VG | G | VG | G |
| Ex. 18 | (C) | VG | G | G | G | G | G |
| Ex. 19 | (A) | VG | G | VG | G | G | G |
| Ex. 20 | (C) | G | G | S | VG | VG | G |
| Ex. 21 | (B) | G | G | S | VG | VG | G |
| Ex. 22 | (A) | G | G | S | VG | VG | G |
| Ex. 23 | (B) | G | G | S | VG | VG | G |
| Ex. 24 | (C) | VG | G | VG | G | VG | G |
| Ex. 25 | (B) | VG | G | VG | G | VG | G |
| Ex. 26 | (C) | G | G | G | G | G | G |
| Ex. 27 | (A) | VG | G | VG | G | VG | G |
| Ex. 28 | (B) | G | G | G | G | G | G |
| Ex. 29 | (A) | VG | G | VG | G | VG | G |
| Ex. 30 | (C) | G | G | G | G | VG | G |

TABLE 2

| | Evaluation equipment | 1) Vividness of images | 2) Dryness of images | 3) Penetration to the back | 4) Rubbing properties | 5) Filling of images | 6) Storage properties |
|---|---|---|---|---|---|---|---|
| Ex. 31 | (A) | VG | G | VG | G | VG | G |
| Ex. 32 | (C) | G | G | G | G | G | G |
| Ex. 33 | (B) | VG | G | VG | G | G | G |
| Ex. 34 | (A) | VG | G | VG | G | VG | G |
| Ex. 35 | (B) | G | G | G | G | G | G |
| Ex. 36 | (C) | VG | G | VG | G | VG | G |
| Ex. 37 | (B) | VG | G | G | G | G | G |
| Ex. 38 | (C) | VG | G | VG | G | G | G |
| Com. Ex. 1 | (A) | P | P | VG | P | P | G |
| Com. Ex. 2 | (B) | P | P | VG | P | P | G |
| Com. Ex. 3 | (B) | S | S | P | G | S | P |
| Com. Ex. 4 | (C) | S | G | P | P | S | S |
| Com. Ex. 5 | (A) | S | S | S | P | S | S |
| Com. Ex. 6 | (C) | P | G | P | G | P | P |
| Com. Ex. 7 | (C) | P | P | VG | P | P | G |
| Com. Ex. 8 | (C) | P | P | VG | P | P | G |
| Com. Ex. 9 | (A) | P | P | VG | P | P | G |
| Com. Ex. 10 | (B) | P | P | VG | P | P | G |
| Com. Ex. 11 | (B) | P | P | VG | P | P | G |
| Com. Ex. 12 | (A) | P | P | VG | P | P | G |
| Com. Ex. 13 | (B) | P | P | VG | P | P | G |
| Com. Ex. 14 | (B) | P | P | VG | P | P | G |
| Com. Ex. 15 | (C) | P | P | VG | P | P | G |
| Com. Ex. 16 | (C) | P | P | VG | P | P | G |
| Com. Ex. 17 | (A) | P | P | VG | P | P | G |
| Com. Ex. 18 | (B) | P | P | VG | P | P | G |
| Com. Ex. 19 | (C) | P | P | VG | P | P | G |
| Com. Ex. 20 | (C) | P | P | VG | P | P | G |
| Com. Ex. 21 | (B) | P | P | VG | P | P | G |
| Com. Ex. 22 | (B) | P | P | VG | P | P | G |
| Com. Ex. 23 | (B) | P | P | VG | P | P | G |
| Com. Ex. 24 | (C) | P | P | VG | P | P | G |
| Com. Ex. 25 | (C) | P | P | VG | P | P | G |

TABLE 3

| | Evaluation equipment | 1) Vividness of images | 2) Dryness of images | 3) Penetration to the back | 4) Rubbing properties | 5) Filling of images | 6) Storage properties |
|---|---|---|---|---|---|---|---|
| Com. Ex. 26 | (B) | P | P | VG | P | P | G |
| Com. Ex. 27 | (B) | P | P | VG | P | P | G |
| Com. Ex. 28 | (A) | G | P | VG | P | P | G |
| Com. Ex. 29 | (A) | G | S | G | S | P | P |
| Com. Ex. 30 | (A) | G | S | G | S | P | S |
| Com. Ex. 31 | (B) | S | S | P | G | S | P |
| Ex. 39 | (C) | G | G | G | G | G | — |
| Ex. 40 | (C) | G | G | G | G | G | — |
| Ex. 41 | (C) | VG | G | VG | G | G | — |
| Ex. 42 | (C) | G | G | VG | G | VG | — |
| Ex. 43 | (C) | G | G | VG | G | VG | — |
| Ex. 44 | (C) | G | G | VG | G | G | — |
| Ex. 45 | (C) | G | G | VG | G | VG | — |
| Ex. 46 | (C) | G | G | VG | G | G | — |
| Ex. 47 | (C) | G | G | VG | G | VG | — |
| Ex. 48 | (C) | G | G | VG | G | VG | — |
| Ex. 49 | (C) | G | G | G | G | G | — |
| Ex. 50 | (C) | G | G | G | G | G | — |
| Ex. 51 | (C) | G | G | VG | G | G | — |
| Ex. 52 | (C) | G | G | VG | G | VG | — |
| Ex. 53 | (C) | G | G | VG | G | VG | — |
| Ex. 54 | (C) | G | G | VG | G | G | — |
| Ex. 55 | (C) | G | G | VG | G | VG | — |
| Ex. 56 | (C) | G | G | VG | G | G | — |
| Ex. 57 | (C) | G | G | VG | G | VG | — |
| Ex. 58 | (C) | G | G | VG | G | VG | — |

The present invention provides a recording liquid having high permeability, and excellent ejection and jet stability and storage stability, and provides a recording liquid cartridge containing this recording liquid. Using this recording liquid cartridge, a recording method and a recording apparatus that can form images having high image density, high-speed properties, and excellent quality with hardly penetrating to the back under high safety can be provided. Thus, the contribution of the present invention to the recording field is significant.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A recording liquid comprising a coloring agent and water, wherein
the recording liquid contains a polyol (A) having a solubility in water at 20° C. ranging from 0.2 wt. % or more to less than 4.5 wt. %, and at least one compound (B) selected from a group of consisting of compounds

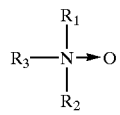

(1)

represented by formulae (1) and (2),
where $R_1$ and $R_2$ are an alkyl group or a hydroxyalkyl group having 1 to 3 carbon atoms, and $R_3$ is an alkyl group of an alkenyl group having 10 to 20 carbon atoms,

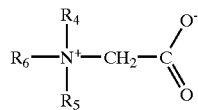

(2)

where $R_4$ and $R_5$ are an alkyl group or a hydroxyalkyl group having 1 to 3 carbon atoms, and $R_6$ is an alkyl group or alkyl group derived from cocoanut oil having 10 to 16 carbon atoms, and the alkyl group or alkyl group derived from cocoanut oil may contain an amide group.

2. The recording liquid according to claim 1, wherein the polyol (A) is a compound represented by formula (3)

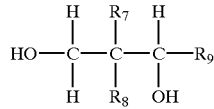

(3)

where $R_7$ and $R_8$ are hydrogen or an alkyl group, and $R_9$ is an alkyl group Both $R_7$ and $R_8$ are not hydrogen at the same time, and the total number of carbon atoms of $R_7$, $R_8$ and $R_9$ is 3 to 9.

3. The recording liquid according to claim 1, wherein the polyol (A) is 2-ethyl-1,3-hexanediol or 2,2,4-trimethyl-1,3-pentanediol.

4. The recording liquid according to claim 1, wherein the polyol (A) is present in a content ranging from 0.1 wt. % to 8 wt. % with respect to the recording liquid.

5. The recording liquid according to claim 1, wherein the content of the compound (B) ranges from 0.1 wt. % to 4 wt. % with respect to the recording liquid.

6. The recording liquid according to claim 1, wherein recording liquid comprises at least one water-soluble organic solvent selected from a group consisting of glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4butanetriol, 1,2,6-hexanetriol, thiodiglycol, 2-pyrrolidone, N-methyl-2-pyrrolidone, N-hydroxyethyl-2-pyrrolidone, and 1,3-dimethyl-2-imidazolidinone.

7. The recording liquid according to claim 1, wherein the coloring agent is a pigment.

8. The recording liquid according to claim 1, wherein the coloring agent is a pigment having an average particle size of from 10 to 200 nm.

9. The recording liquid according to claim 1, wherein the coloring agent is a pigment having one or more carboxyl groups.

10. The recording liquid according to claim 1, wherein the coloring agent is a pigment having one or more carboxyl groups, wherein the one or more carboxyl groups is bonded to a dispersant dispersed in water.

11. The recording liquid according to claim 1, wherein the coloring agent is a pigment having one or more hydrophilic groups bonded to a surface thereof, and being dispersed in water.

12. The recording liquid according to claim 1, wherein the coloring agent is a pigment having one or more hydrophilic groups that are carboxyl groups.

13. A recording liquid cartridge comprising a recording liquid reservoir containing a recording liquid, wherein the recording liquid is a recording liquid according to claim 1.

14. A recording liquid cartridge comprising a recording liquid reservoir containing a recording liquid and a head portion for ejecting recording liquid droplets, wherein the recording liquid is a recording liquid according to claim 1.

15. A recording method for forming images on a recording medium comprising a step of ejecting to fry a recording liquid in form of droplets from small ink outlets, wherein the recording liquid is a recording liquid according to claim 1.

16. The recording method according to claim 15, wherein images are formed on a recording medium by applying thermal energy to the recording liquid.

17. The recording method according to claim 15, wherein the recording medium contains pulp fibers as a main component, and has a sizing degree of 10 S or more and an air permeability of 5 to 50 S.

18. The recording method according to claim 15, wherein an injection amount V (p1) per droplet ejected from a recording head satisfies equation (4)

$$2.5 \times 10^8 / R^{2.6} \leq V \leq 6.0 \times 10^8 / R^{2.6} \tag{4}$$

where R is a maximum dot density of the droplets when recording is performed on a recording medium containing pulp fibers as the main component and having a sizing degree of 10 S or more and an air permeability of 5 to 50 S, which is represented in unit of dpi (=dot per inch).

19. The recording method for forming images on a recording medium according to claim 15, comprising a step of ejecting to fry a plurality of recording liquid droplets from the same ink outlet or the separated ink outlets in such a manner that pixel regions are at least partially overlapped on the recording medium, wherein a difference in ejection time of two recording liquid droplets that overlap on the recording medium is 0.125 ms or less.

20. An inkjet recording apparatus comprising:
   a recording liquid cartridge having a recording liquid reservoir containing a recording liquid; and
   a recording head for ejecting recording liquid droplets comprising:
      a recording liquid cartridge in which are included:
         a recording liquid reservoir containing a recording liquid; and a recording head for ejecting recording liquid droplets,
   wherein the recording liquid cartridge is a recording liquid cartridge according to claim 13.

21. A recording medium on which images are recorded with the recording liquid according to claim 1,
   wherein the recording medium contains pulp fibers as a main component, and has a sizing degree of 10 S or more and an air permeability of 5 to 50 S.

22. A recording medium used in the recording method according to claim 15,
   wherein the recording medium contains pulp fibers as a main component, and has a sizing degree of 10 S or more and an air permeability of 5 to 50 S.

* * * * *